United States Patent
Fidigatti et al.

(10) Patent No.: US 10,511,188 B2
(45) Date of Patent: Dec. 17, 2019

(54) METHOD FOR CONTROLLING AN ELECTRIC POWER DISTRIBUTION GRID

(71) Applicant: ABB S.p.A., Milan (IT)

(72) Inventors: Antonio Fidigatti, Spino d'Adda (IT); Fabio Monachesi, Foligno (IT); Federico Silvestro, Genoa (IT); Francesco Adinolfi, Genoa (IT)

(73) Assignee: ABB S.P.A., Milan (IT)

( * ) Notice: Subject to any disclaimer, the term of this patent is extended or adjusted under 35 U.S.C. 154(b) by 149 days.

(21) Appl. No.: 15/660,728

(22) Filed: Jul. 26, 2017

(65) Prior Publication Data

US 2018/0034318 A1    Feb. 1, 2018

(30) Foreign Application Priority Data

Jul. 26, 2016  (EP) .................................... 16181163

(51) Int. Cl.
| | | |
|---|---|---|
| *H02J 13/00* | (2006.01) | |
| *G05B 15/02* | (2006.01) | |
| *G06Q 50/06* | (2012.01) | |
| *H02J 3/14* | (2006.01) | |
| *G06Q 10/04* | (2012.01) | |
| *H02J 3/00* | (2006.01) | |

(52) U.S. Cl.
CPC .......... *H02J 13/0006* (2013.01); *G05B 15/02* (2013.01); *G06Q 10/04* (2013.01); *G06Q 50/06* (2013.01); *H02J 3/14* (2013.01); *H02J 2003/003* (2013.01); *Y02B 70/3225* (2013.01); *Y02P 80/11* (2015.11); *Y04S 20/222* (2013.01)

(58) Field of Classification Search
None
See application file for complete search history.

(56) References Cited

U.S. PATENT DOCUMENTS

| | | | |
|---|---|---|---|
| 2013/0311236 A1 | 11/2013 | Takahashi et al. | |
| 2015/0028671 A1* | 1/2015 | Ragaini ..................... | H02J 3/14 307/29 |

FOREIGN PATENT DOCUMENTS

| | | |
|---|---|---|
| DE | 19934543 A1 | 2/2001 |
| EP | 2843785 A1 | 3/2015 |
| WO | 2013135296 A1 | 9/2013 |

OTHER PUBLICATIONS

European Search Report, EP16181163, ABB S.p. A., dated Dec. 7, 2017, 7 pages.

* cited by examiner

*Primary Examiner* — Sean Shechtman
(74) *Attorney, Agent, or Firm* — Taft Stettinius & Hollister LLP; J. Bruce Schelkopf

(57) ABSTRACT

A method is provided for controlling an electric power distribution grid, which includes one or more first grid devices having changeable set-points. The method includes the following steps: determining a consumption target value for the electric power distribution grid, the consumption target value being determined with reference to at an end instant of an observation time window, in which consumption of the electric power distribution grid at a given observation electric node of the electric power distribution grid is observed; and executing a control procedure for controlling the set-points of the first grid devices.

19 Claims, 14 Drawing Sheets

METHOD FOR CONTROLLING AN ELECTRIC POWER DISTRIBUTION GRID

Figure 1:
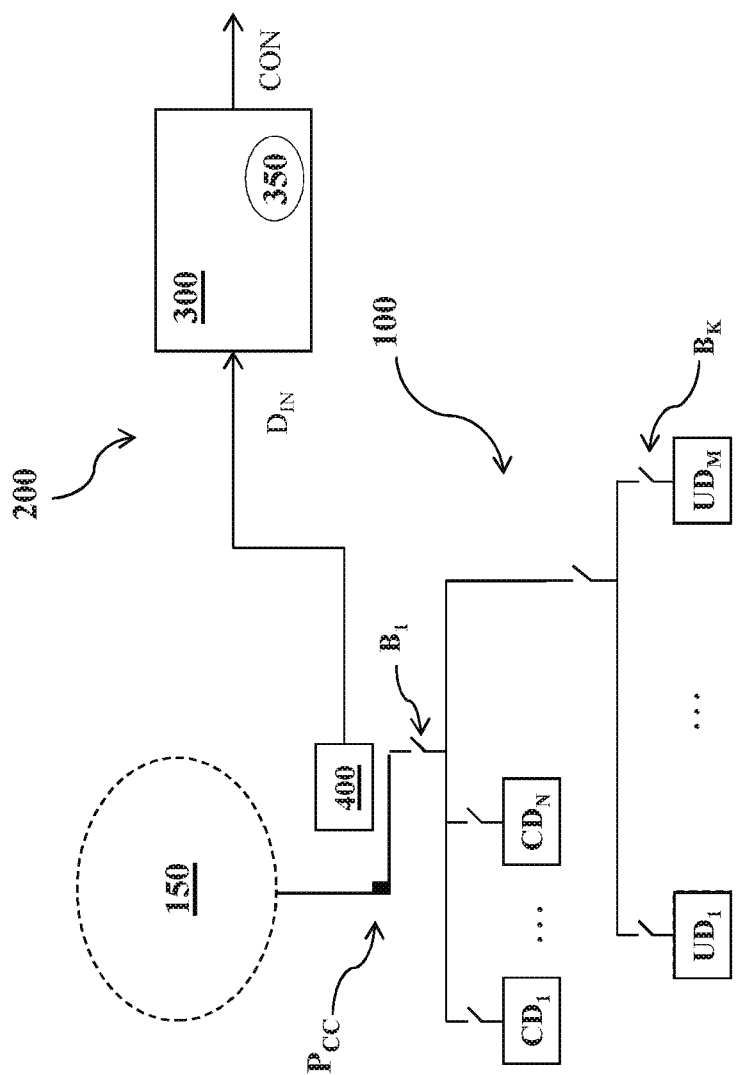
Figure 2:
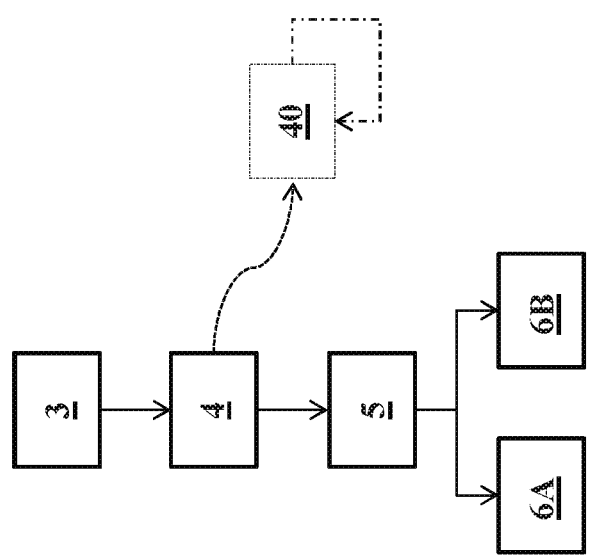
Figure 3:
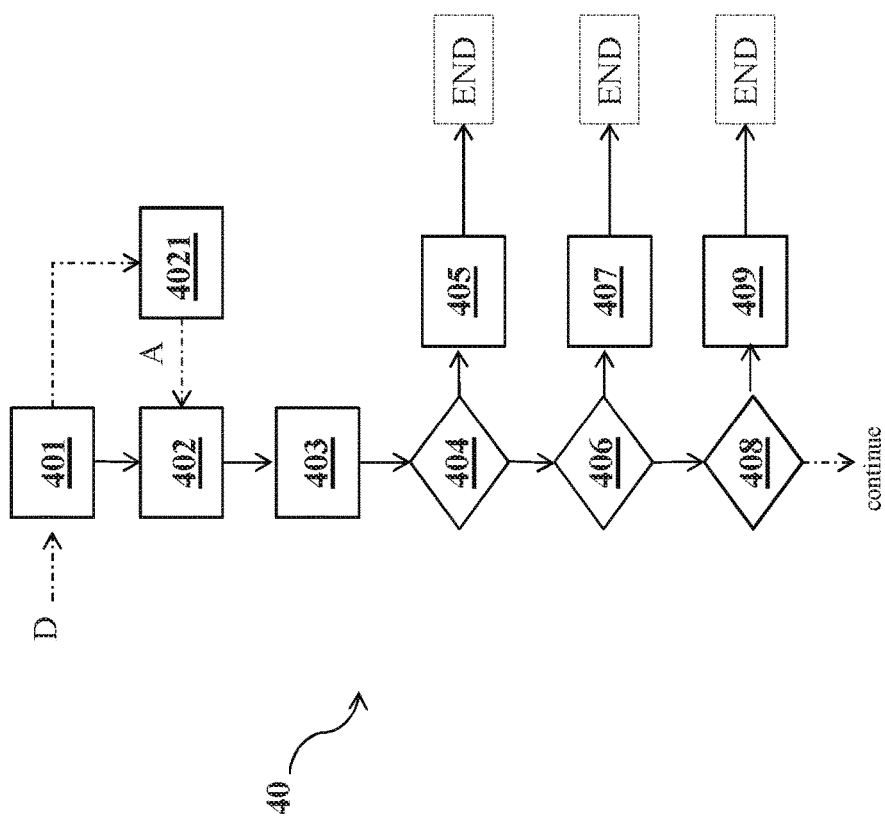
Figure 4:
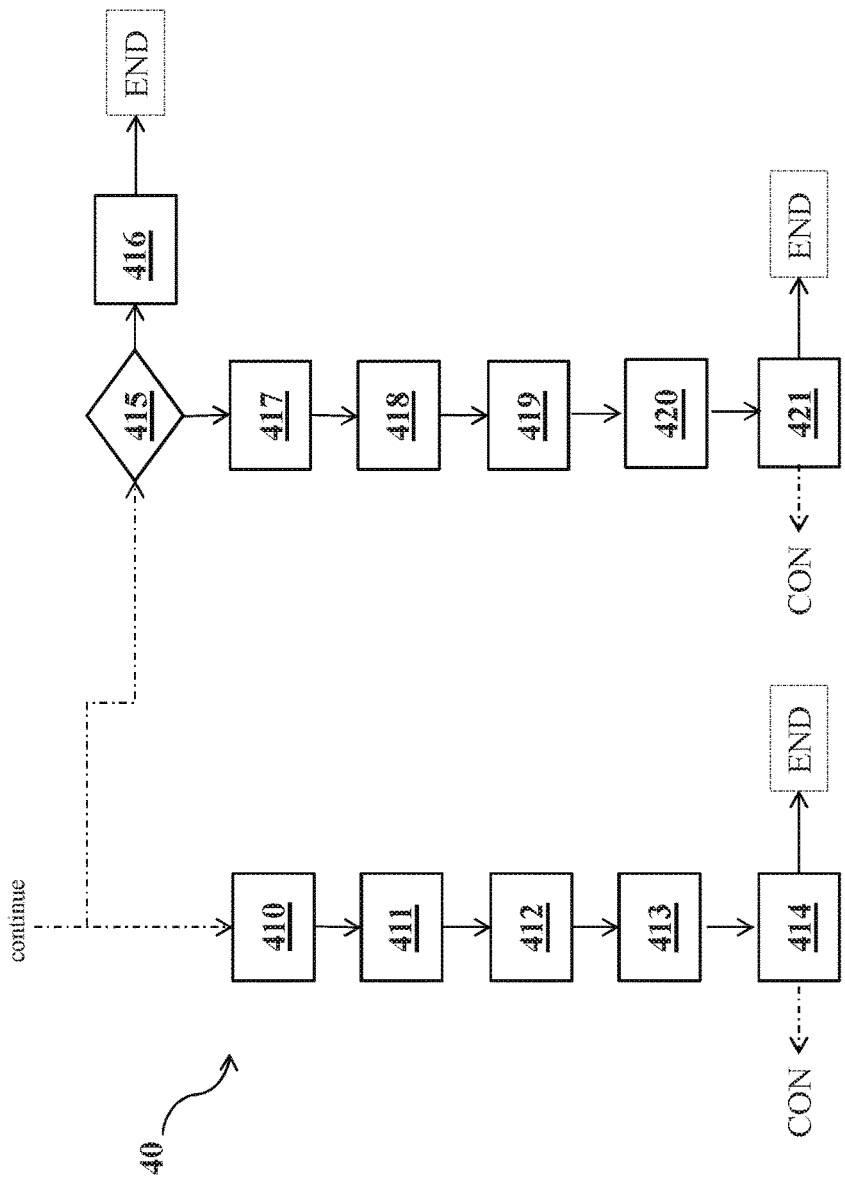

The present invention relates to a method for controlling an electric power distribution grid. As is known, current electric power distribution grids typically comprise a huge number of different electric devices operating as loads or generators, mostly independently one from another.

Experience has shown how the missing coordination of the operation of these electric devices may give rise to high peaks of electric consumption, which may be very variable in time.

The uncontrolled rise of electric consumption levels may lead to the malfunctioning of the electric power distribution grid and/or to the intervention of overload protection devices with possible relevant discomforts for the users.

Further, the uncontrolled increase of the electric energy demand may give rise to the obligation of paying expensive penalty fees to the electric energy provider.

Currently available control methods for actively managing the consumption behaviour of electric power distribution grids do not provide satisfactory performances.

Generally, these control methods are based on the adoption of predefined load shedding schemes (e.g. rolling blackout schemes), which suffer of a number of disadvantages.

Mostly, they adopt instantaneous measurements as a basis for load disconnection, i.e., they disconnect the electric loads immediately when power consumption exceeds a fixed threshold. This may cause unnecessary disconnections of electric loads in case of transients, e.g. during a motor starting.

Further, currently available control methods have often shown to be unsuitable to manage the consumption behaviour of electric power distribution grids, in which electric generators (e.g. batteries, photovoltaic systems, solar generation systems, wind generation systems, diesel generation systems, and the like) providing electric energy at local level are installed.

Additionally, currently available control methods are generally not adapted to fully exploit the fact that most of the electric loads or generators installed in the more recent electric power distribution grids have set-points that can be dynamically changed in time.

In the market, it is thus still felt the demand for control methods that are capable of providing an effective management of the consumption behaviour of electric power distribution grids, thereby avoiding or reducing undesired overload protection interventions and the obligation of paying burden penalty fees to the energy provider.

In order to respond to this need, the present invention provides a method for controlling an electric power distribution grid, according to the following claim 1 and the related dependent claims.

In a general definition, the present invention relates to a method for controlling an electric power distribution grid, which comprises one or more first grid devices having changeable set-points.

The method, according to the invention, comprises the step of determining a consumption target value for the electric power distribution grid at an end instant of an observation time window, in which consumption of said electric power distribution grid at a given observation electric node of said electric power distribution grid is observed.

The method, according to the invention, comprises the step of executing a control procedure for controlling the set-points of said first grid devices.

According to the invention, said control procedure comprising the following steps:
acquiring input data related to one or more detected electric quantities of said electric power distribution grid at a check instant within said observation time window;
calculating a measured value of consumption at said observation electric node at said check instant;
calculating a consumption forecast value for said electric power distribution grid at the end instant of said observation time window;
checking whether intervention criteria to modify one or more set-points of said first grid devices are met at said check instant;
if said intervention criteria are not met, maintaining unchanged the set-points of said first grid devices;
if said intervention criteria are met, checking whether the consumption forecast value meets first convergence criteria with respect to the consumption target value;
if the consumption forecast value meets said first convergence criteria, maintaining unchanged the set-points of said first grid devices;
if said consumption forecast value does not meet said first convergence criteria and no set-points of said first grid devices have already been changed before said check instant, executing the following steps:
calculating a requested power variation value for said electric power distribution grid to reach said consumption target value;
calculating, for one or more first grid devices, a characteristic curve on a $\Delta P$-r reference system;
calculating, for said electric power distribution grid, a characteristic curve on said $\Delta P$-r reference system;
calculating a priority level for said electric power distribution grid;
providing control signals to change the set-points of one or more first grid devices, said control signals comprising information indicative of the priority level calculated for said electric power distribution grid.

Preferably, if said consumption forecast value does not meet said first convergence criteria and the set-points of said first grid devices have already been changed within said observation time window, said control procedure (40) comprises the following steps:
checking whether said consumption forecast value meets second convergence criteria with respect to said consumption target value;
if said consumption forecast value meets said second convergence criteria, maintaining unchanged the set-points of said first grid devices;
if said consumption forecast value does not meet said second convergence criteria, executing the following steps:
calculating a requested power variation value for said electric power distribution grid to reach said consumption target value;
calculating, for one or more first grid devices, a characteristic curve on a $\Delta P$-r reference system;
calculating, for said electric power distribution grid, a characteristic curve on said $\Delta P$-r reference system;
calculating a priority level for said electric power distribution grid;
providing control signals to change the set-points of one or more first grid devices, said control signal comprising information indicative of the priority level calculated for said electric power distribution grid.

Preferably, said step of checking whether said intervention criteria are met comprises the following steps:
checking whether said check instant is within an inhibition time window ($T_{HW}$) included in said observation time window;
checking whether said check instant is a multiple of a given intervention period.

Preferably, said measured value of consumption is calculated on the base of average values related to one or more electric quantities of said electric power distribution grid, said average values being calculated on the base of said input data.

Preferably, the method, according to the invention, comprises the step of setting a priority level for said electric power distribution grid at the end instant of said observation time window.

Preferably, the method, according to the invention, comprises the step of generating control signals to set one or more set-points of said first grid devices at corresponding predefined values at the end instant of said observation time window or the step of maintaining unchanged the set-points of said first grid devices at the end instant of said observation time window.

Preferably, said observation time window has a duration corresponding to an energy billing period adopted for said electric power distribution grid.

The method, according to the invention, provides a coordinated management of the configuration of an electric power distribution grid to control the consumption of this latter over subsequent predefined time windows.

In particular, the method, according to the present invention, allows to dynamically and adaptively managing the set-points of installed grid devices to achieve optimal consumption targets over said subsequent predefined time windows.

The method, according to the invention, adopts consumption management criteria that can be easily tuned and adapted in accordance with the operating conditions of an electric power distribution grid.

In a further aspect, the present invention relates to a computer program, according to the following claim 11.

In a further aspect, the present invention relates to a computerised device, according to the following claim 12.

In a further aspect, the present invention relates to a control apparatus, according to the following claim 13.

In a further aspect, the present invention relates to a circuit breaker (e.g. a moulded case or air circuit breaker), according to the following claim 14.

Further characteristics and advantages of the present invention shall emerge more clearly from the description of preferred but not exclusive embodiments illustrated purely by way of example and without limitation in the attached drawings, in which:

FIG. 1 schematically illustrates an electric power distribution grid and a control apparatus thereof, according to the invention;

FIG. 2-12 are diagrams that schematically illustrate the method, according to the invention.

With reference to the mentioned figures, the present invention relates to a method 1 for controlling a low or medium voltage electric power distribution grid 100.

Within the framework of the present invention the term "low voltage" relates to operating voltages up to 1 kV AC and 1.5 kV DC whereas the term "medium voltage" relates to operating voltages higher than 1 kV AC and 1.5 kV DC up to several tens of kV, e.g. up to 72 kV AC and 100 kV DC.

The electric power distribution grid 100 may be an electric network for relatively large industrial, commercial and residential buildings or plants. As an example, it may be characterised by an average power consumption comprised in the range between 0.05 MW and 10 MW.

The electric power distribution grid 100 is supplied by an electric power source 150, which may be, for example, an electric power generation utility or include a plurality of concurrent electric power generation systems or plants.

The electric power distribution grid 100 comprises one or more grid devices $CD_1, \ldots, CD_N, UD_1, \ldots, UD_M$ adapted to operate as electric loads (i.e. adapted to consume electric energy provided by the electric power source 150 and/or by some electric generators) or adapted to operate as electric generators (i.e. adapted to provide electric power to the electric power source 150 and/or to some electric loads).

As shown in FIG. 1, the grid devices $CD_1, \ldots, CD_N, UD_1, \ldots, UD_M$ may be arranged on different grid branches, according to a multi-level configuration.

However, different configurations are possible, according to the needs.

The electric power distribution grid 100 comprises one or more first grid devices $CD_1, \ldots, CD_N$ having changeable set-points, i.e. having set-points that can be modified during the operation of the electric power distribution grid.

The electric power distribution grid 100 may also comprise one or more second grid devices $UD_1, \ldots, UD_M$ having unchangeable set-points, i.e. having set-points that cannot be modified during the operation of the electric power distribution grid, e.g. due to management requirements or constraints provided for this latter.

For the sake of clarity, it is important to specify that a given grid device $CD_1, \ldots, CD_N, UD_1, \ldots, UD_M$ may be considered as having changeable or unchangeable set-points depending on the operation foreseen for said grid device in the electric power distribution grid 100 and not depending on its specific structure or possible operation modes.

Thus, a given grid device (e.g. an electric generator), which in principle might operate at different set-points, is considered as having unchangeable set-points if it is not possible to intervene on it during the operation of the electric power distribution grid 100.

Conversely, a given grid device (e.g. an on/off electric load), which in principle can operate only at a predetermined set-point, is considered as having changeable set-points if it can be switched on/off according to the needs, without specific requirements, during the operation of the electric power distribution grid 100.

As it may be easily understood, both the first grid devices $CD_1, \ldots, CD_N$ and the second grid devices $UD_1, \ldots, UD_M$ may be adapted to operate as electric loads or to operate as electric generators. As an example, they may include drivers, on/off loads, batteries, capacitors banks, current or voltage generators, and the like.

It is evidenced that, even if they are changeable during the operation of the electric power distribution grid 100, the operation set-points of the first grid devices $CD_1, \ldots, CD_N$ are anyway subject to technical constraints and/or time constraints.

Examples of technical constraints are the technical requirements given by typology or nature of the first grid devices.

Examples of time constraints are the following:
maximum disconnection time (tmax, of f) for electric loads or generators: this parameter represents the maximum time period for which an electric load or a generator can be disconnected from the electric power distribution grid;

minimum disconnection time (tmax, train, off) for electric loads or generators: this parameter represents the minimum time period for which an electric load or a generator cannot be reconnected to the electric power distribution grid once it has been turned off;

minimum connection time (tmax, tmin, on) for electric loads or generators: this parameter represents the minimum time period requested by an electric load or a generator to be connected to the electric power distribution grid once it has been turned on.

Since they have changeable set-points during the operation of the electric power distribution grid 100, the set points of the first grid devices $CD_1, \ldots, CD_N$ can be advantageously assigned with a given priority, which is a numerical value (index) indicative of the order with which said set-points have to be changed, when required to do so.

As it will better emerge from the following, at each operating instant, the operation of each first grid device $CD_1, \ldots, CD_N$ may be represented by a characteristic curve on a $\Delta P$-r reference system, where $\Delta P$ is the (positive or negative) variation of power that can be provided by said first grid device when its set-points are changed and r is the priority assigned to the set-points of said first grid device for being modified.

For the sake of clarity, it is here specified that, within the framework of the present invention, a $\Delta P$-r reference system is a reference system (e.g. of the Cartesian type) in which a variation of power, which can be provided by a device, apparatus or grid, by modifying the set-points thereof is expressed as a function of the priority assigned to the set-points of said device, apparatus or grid.

Advantageously, the electric power distribution grid 100 comprises one or more controllable switching devices $B_1, \ldots, B_K$ for disconnecting/connecting one or more grid devices $CD_1, \ldots, CD_N, UD_1, \ldots, UD_M$ or one or more grid branches from/with the electric power source 150. The switching devices $B_1, \ldots, B_K$ may include, for example, circuit breakers, contactors, I-O interfaces, communication interfaces or other similar devices.

The method, according to the invention, provides for controlling the consumption of the electric power distribution grid 100 at a predetermined observation electric node $P_{CC}$ of this latter over a predetermined observation time window $T_{OW}$.

For the sake of clarity, it is here specified that, in the framework of the present invention, the term "consumption" should be intended in terms of energy consumption, average power consumption or other physical quantities equivalent to these latter; it is also specified that the term "power" may be referred to "active power", "reactive power" or "apparent power" according to the specific need.

During the operation of the electric power distribution grid 100, the method, according to the invention, is cyclically executed at subsequent observation time windows $T_{OW}$.

The observation electric node $P_{CC}$ is any electric node of the electric power distribution grid 100, at which the consumption behaviour of the electric power distribution grid 100 is intended to be observed.

The observation electric node $P_{CC}$ may be selected according to the needs, e.g. according to management constraints requested for the electric power distribution grid 100.

The observation time window $T_{OW}$ is a time period, in which consumption of the electric power distribution grid 100 at the observation electric node $P_{CC}$ is observed.

Preferably, the observation time window $T_{OW}$ has a duration corresponding to an energy billing period (e.g. 15 minutes) adopted by the electric energy provider to supply electric power to the electric power distribution grid 100.

However, the duration of the observation time window $T_{OW}$ may be selected according to the needs.

Observation time windows $T_{OS}$ of different duration may thus be employed during the operating life of the electric power distribution grid 100, Each observation time window $T_{OW}$ has a start instant $t_S$ and an end instant $t_E$.

Preferably, the start instant $t_S$ of each observation time window $T_{OW}$ is selected so as to coincide with the end instant $t_E$ of the immediately precedent observation time window.

Preferably, the start instants $t_S$ of the subsequent observation time windows $T_{OS}$ employed during the operating life of the electric power distribution grid 100 are synchronised with a reference signal that is received from the electric power source 100 on a periodic basis, for example once a day.

According to the invention, the method 1 comprises a step 3 of determining a consumption target value $E_{CTV}$ for the electric power distribution grid 100 (at the observation electric node $P_{CC}$ thereof) at the end instant $t_E$ of an observation time window $T_{OW}$.

The consumption target value $E_{CTV}$ represents the consumption level that is requested to be achieved by the electric power distribution grid 100 at the end of the observation time window $T_{OW}$.

The consumption target value $E_{CTV}$ depends on the on-going operative conditions of the electric power distribution grid 100 and it may thus change from an observation time window $T_{OW}$ to another.

The consumption target value $E_{CTV}$ is advantageously selected in such a way to satisfy management constraints requested for the electric power distribution grid 100 during the observation time window $T_{OW}$ and established, for example, by the grid manager or by the electric energy provider.

According to the invention, the method 1 comprises a step 4 of executing a control procedure 40 for controlling the set-points of the first grid devices $CD_1, \ldots, CD_N$ of the electric power distribution grid 100.

In general terms, the control procedure 40 comprises a series of control steps aimed at tuning, depending on the consumption of the electric power distribution grid 100 during an observation time window $T_{OW}$, the set-points of the first grid devices $CD_1, \ldots, CD_N$ in such a way to make the electric power distribution grid 100 to achieve the consumption target value $E_{CTV}$ foreseen for said observation time window $T_{OW}$.

The control procedure 40 is advantageously executed at one or more predetermined check instants $t_C$ included in the observation time window $T_{OW}$.

Preferably, each check instant $t_C$ is a multiple of a predetermined sampling period $\Delta T_S$ (e.g. 1 s), which is measured to start from the start instant $t_S$ of the observation time window $T_{OW}$. In practice, each check instant can be defined as $t_C = K1 * \Delta T_S$, where K1 is a positive integer number counted to start from the starting instant $t_S$.

As it will be apparent from the following, at each check instant $t_C$ of the observation time window $T_{OW}$, the control procedure 40 provides for measuring the actual consumption of the electric power distribution grid 100 at the observation electric node $P_{CC}$, checking whether the actual consumption of the electric power distribution grid 100 is compatible with the foreseen consumption target value $E_{CTV}$ and providing control signals CON to modify the set-points of the first grid devices $CD_1, \ldots, CD_N$, if this is necessary to achieve the consumption target value $E_{CTV}$.

As it will be more apparent from the following, according to the invention, any possible intervention of the first grid devices $CD_1, \ldots, CD_N$ occurs only when the check instant $t_C$, in which the control procedure 40 is executed, is not included in a predetermined inhibition time window $T_{HW}$ comprised in the observation time window $T_{OW}$ and when said check instant is a multiple of a predetermined intervention period $\Delta T_I$ (e.g. 60 s), which is measured to start from the start instant is of the observation time window $T_{OW}$.

The control procedure 40 is described in the following.

According to the invention, the control procedure 40 comprises the step 401 of acquiring input data $D_{IN}$ related to one or more detected electric quantities of the electric power distribution grid 100 at a check instant $t_C$ included in the observation time window $T_{OW}$.

The input data $D_{IN}$ may relate to any suitable electric quantities, which concern the operation of one or more grid devices $CD_1, \ldots, CD_N, UD_1, \ldots, UD_M$ and allow measuring the actual consumption of the electric power distribution grid 100 at the observation electric node $P_{CC}$.

Preferably, input data $D_{IN}$ are provided by one or more detection devices 400 (e.g. voltage sensors, current sensors, and the like) of the electric power distribution grid 100. However, according to some variants of the invention, input data $D_{IN}$ may include also data derived from tables or databases describing the operation characteristics of one or more grid devices $CD_1, \ldots, CD_N, UD_1, \ldots, UD_M$ of the electric power distribution grid 100.

According to the invention, the control procedure 40 comprises the step 402 of calculating, at the check instant $t_C$, a measured value $E_{CMV}$ of consumption at the observation electric node $P_{CC}$.

The calculation of the measured value $E_{CMV}$ is advantageously based on input data $D_{IN}$ acquired at the previous step 401 of the control procedure 40.

Preferably, the measured value $E_{CMV}$ is calculated on the base of average values A of one or more electric quantities of the electric power distribution grid 100. These average values A may in turn be calculated on the base of input data $D_{IN}$ by performing moving average calculations (according to calculation algorithms of known type) over a suitable calculation time window that may be selected according to the needs.

Figure 5:
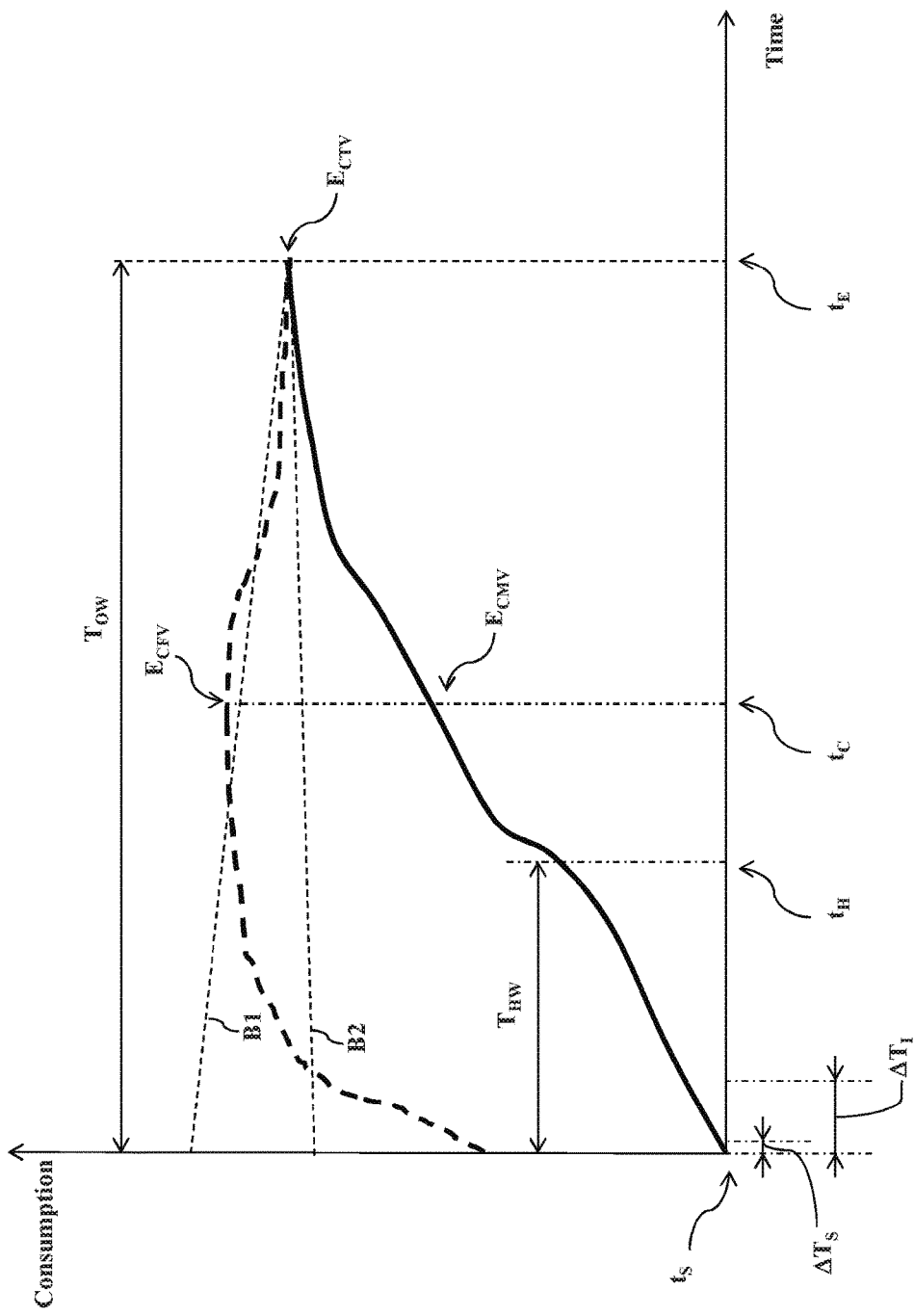

Referring to FIG. 5, a schematic example of curve (represented by a continuous line) indicative of the actual consumption of the electric power distribution grid at the observation electric node $P_{CC}$ is shown. Such a curve schematically shows the sequence of measured values $E_{CMV}$ calculated at corresponding subsequent check instants $t_C$.

According to the invention, the control procedure 40 comprises the step 403 of calculating a consumption forecast value $E_{CFV}$ for the electric power distribution grid 100. The consumption forecast value $E_{CFV}$ is advantageously referred to the end instant $t_E$ of the observation time window $T_{OW}$.

Basically, the consumption forecast value $E_{CFV}$ represents an estimation of the consumption level of the electric power distribution grid at the observation electric node $P_{CC}$, which is likely to be achieved by the electric power distribution grid 100 at the end instant $t_E$ of the observation time window $T_{OW}$ in view of the actual consumption level measured at the check instant $t_C$. Referring to FIG. 5, a schematic example of curve (represented by a dotted line) indicative of the consumption forecast (at the end instant $t_E$) for the electric power distribution grid is shown. Such a curve schematically shows the sequence of forecast values $E_{CFV}$ calculated at corresponding subsequent check instants.

Preferably, the consumption forecast value $E_{CFV}$ is calculated basing on the actual consumption of the electric power distribution grid 100 at the check instant $t_C$, in other words basing on the consumption measured value $E_{CMV}$ indicative of the actual consumption at the check instant $t_C$. As an example, at each check instant $t_C$, the consumption forecast value $E_{CFV}$ may be calculated according to the following relation:

$$E_{CFV}(t_C) = E_{CMV}(t_C) + E_{CMV}(t_C)\left(\frac{t_E - t_C}{t_C}\right)$$

where $E_{CMV}(t_C)$ is the consumption measured value $E_{CMV}$ (at the observation electric node $P_{CC}$) at the check instant $t_C$ and $t_E - t_C$ is the residual time interval before the end of the observation time window $T_{OW}$ (to start from the check instant $t_C$).

According to the invention, the control procedure 40 comprises a step 404, 406 of checking whether intervention criteria for modifying one or more set-points of the first grid devices $CD_1, \ldots, CD_N$ are met at the check instant $t_C$.

As it will be possible to appreciate from the following, said intervention criteria are checked to ensure a stable and correct implementation of the control procedure 40 taking into account the processing resources available to execute the control procedure 40.

Preferably, the mentioned intervention criteria only concern the timing of the check instant $t_C$ within the observation time window $T_{OW}$ and do not relate to the consumption behaviour of the electric power distribution grid.

Preferably, said intervention criteria comprise the condition that the check instant $t_C$ has to be out of an inhibition time window $T_{HW}$. The inhibition time window $T_{HW}$ is included in the observation time window $T_{OW}$ and has a predefined duration calculated to start from the starting instant $t_S$.

Such an intervention condition is advantageously checked to ensure that the calculated sequence of forecast values $E_{CFV}$ is sufficiently stabilized at the check instant $t_C$.

Preferably, said intervention criteria comprise the condition that the check instant $t_C$ has to be a multiple of a given intervention period $\Delta T_I$, which is measured to start from the start instant $t_S$ of the observation time window $T_{OW}$.

In practice, said intervention criteria comprise the condition that $t_C = K2*\Delta T_I$, where K2 is a positive integer number counted to start from the starting instant $t_S$.

Advantageously, the intervention period $\Delta T_I$ (e.g. 60 s) is predefined and is longer than the sampling period $\Delta T_S$, advantageously a multiple of this latter.

Preferably, the intervention period $\Delta T_I$ is set on the base of the processing resources available to execute the steps of the control procedure 40, in particular to provide possible control signals to modify the set-point of the first grid devices $CD_1, \ldots, CD_N$.

If the mentioned intervention criteria are not satisfied, the control procedure 40 provides for maintaining unchanged the set-points of the first grid devices $CD_1, \ldots, CD_N$. In this case, the control procedure 40 is terminated and it will be executed at a following check instants $t_C + \Delta T_S$. If the mentioned intervention criteria are met, the control procedure 40 will proceed to check (step 408) the consumption behaviour of the electric power distribution grid 100 at the check instant $t_C$ in relation to the consumption target value $E_{CTV}$ to be achieved at the end instant $t_E$ of the observation time window $T_{OW}$.

Preferably, the step of checking whether intervention criteria comprises the step 404 of checking whether the check instant $t_C$ is within the inhibition time window $T_{HW}$ and the step of checking 406 whether the check instant $t_C$ is a multiple of the intervention period $\Delta T_I$.

In a preferred embodiment of the invention (FIG. 3), after the above described step 403 of calculating the consumption forecast value $E_{CFV}$, the control procedure 40 comprises the step 404 of checking whether the check instant $t_C$ is within the inhibition time window $T_{HW}$.

If the check instant $t_C$ is within the inhibition time window $T_{HW}$, the control procedure 40 comprises the step 405 of maintaining unchanged the set-points of the first grid devices $CD_1, \ldots, CD_N$. In this case, the control procedure 40 is terminated and it will be executed at a following check instants $t_C + \Delta T_S$.

If the check instant $t_C$ is not within the inhibition time window $T_{HW}$, the control procedure 40 comprises the step 406 of checking whether the check instant $t_C$ is a multiple of the intervention period $\Delta T_I$.

If the check instant $t_C$ is not a multiple of the intervention period $\Delta T_I$, the control procedure 40 comprises the step 407 of maintaining unchanged the set-points of the first grid devices $CD_1, \ldots, CD_N$. In this case, the control procedure 40 is terminated and it will be executed at a following check instants $t_C + \Delta T_S$.

If the check instant $t_C$ is a multiple of the intervention period $\Delta T_I$, the above intervention criteria are met and the control procedure 40 will proceed to check (step 408) the consumption behaviour of the electric power distribution grid 100.

According to the invention, if said intervention criteria are met, the control procedure 40 comprises the step 408 of checking whether the consumption forecast value $E_{CFV}$ meets first convergence criteria with respect to the consumption target value $E_{CTV}$.

Preferably, according to said first convergence criteria, the consumption forecast value $E_{CFV}$ at the check instant $t_C$, must satisfy the following condition:

$$\{E_{CFV} <= E1; E_{CFV} >= E2\}$$

wherein E1, E2 are respectively first and second predefined boundary values, with E1>E2.

In practice, at the step 408, the control procedure 40 provides for checking whether the consumption forecast value $E_{CFV}$ falls within a first tolerance region TR1, which is defined by first and second predefined boundaries B1, B2 ensuring the convergence to the consumption target value $E_{CTV}$.

Said predefined boundaries are indicative of the sequence of the maximum and minimum consumption forecast absolute values ensuring that the consumption target value $E_{CTV}$ is achieved without intervening on the first grid devices $CD_1, \ldots, CD_N$.

Preferably, the first and second predefined boundaries B1, B2 are calculated as polynomial curves, which are optimized (based on the overall number of grid devices) in such a way to allow the maximum consumption value set for the electric power distribution grid to be exceeded (even remarkably) at one or more instants provided that the overall consumption of the electric power distribution grid (in the observation time window $T_{OW}$) does not exceed the consumption target value $E_{CTV}$.

Referring to FIGS. 5-8, said predefined boundaries are schematically represented by corresponding boundary lines B1, B2 converging to the consumption target value $E_{CTV}$ and intersecting this latter at the end instant $t_E$ of the observation time window $T_{OW}$.

Figure 6:
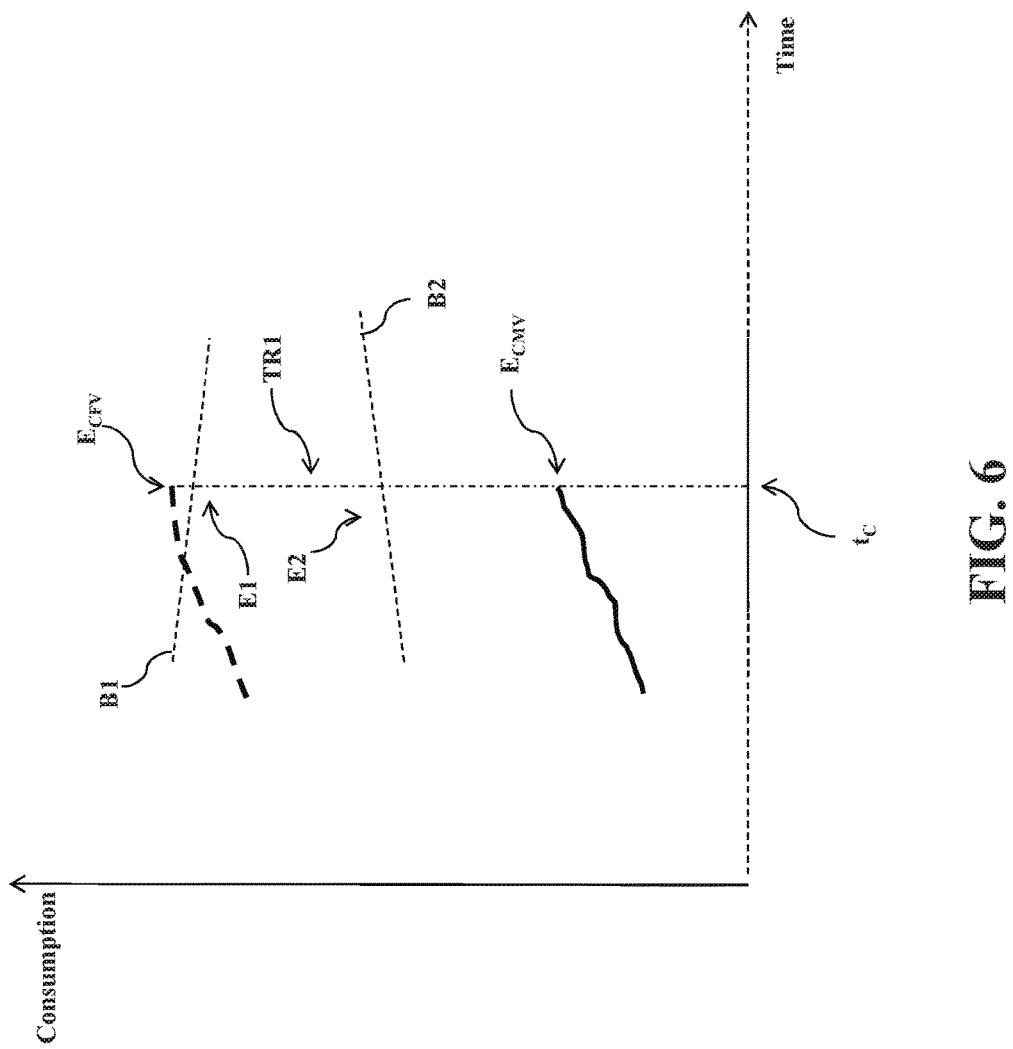

Referring to FIG. 6, it is shown a scenario in which the consumption forecast value $E_{CFV}$ meets the following condition: $\{E_{CFV} > E1; E_{CFV} > E2\}$.

This condition does not meet the above mentioned first convergence criteria. Therefore, it will be necessary to change the set-points of one or more first grid devices $CD_1, \ldots, CD_N$ to reach the consumption target value $E_{CTV}$ at the end instant $t_E$ of the observation time window $T_{OW}$.

More particularly, as the consumption forecast value $E_{CFV}$ is too high with respect to the first tolerance region TR1, it will be necessary to change the set-points of one or more first grid devices $CD_1, \ldots, CD_N$ in such a way to reduce the consumption of the electric power distribution grid in the residual time interval $t_E - t_C$ before the end of the observation time window $T_{OW}$.

Figure 7:
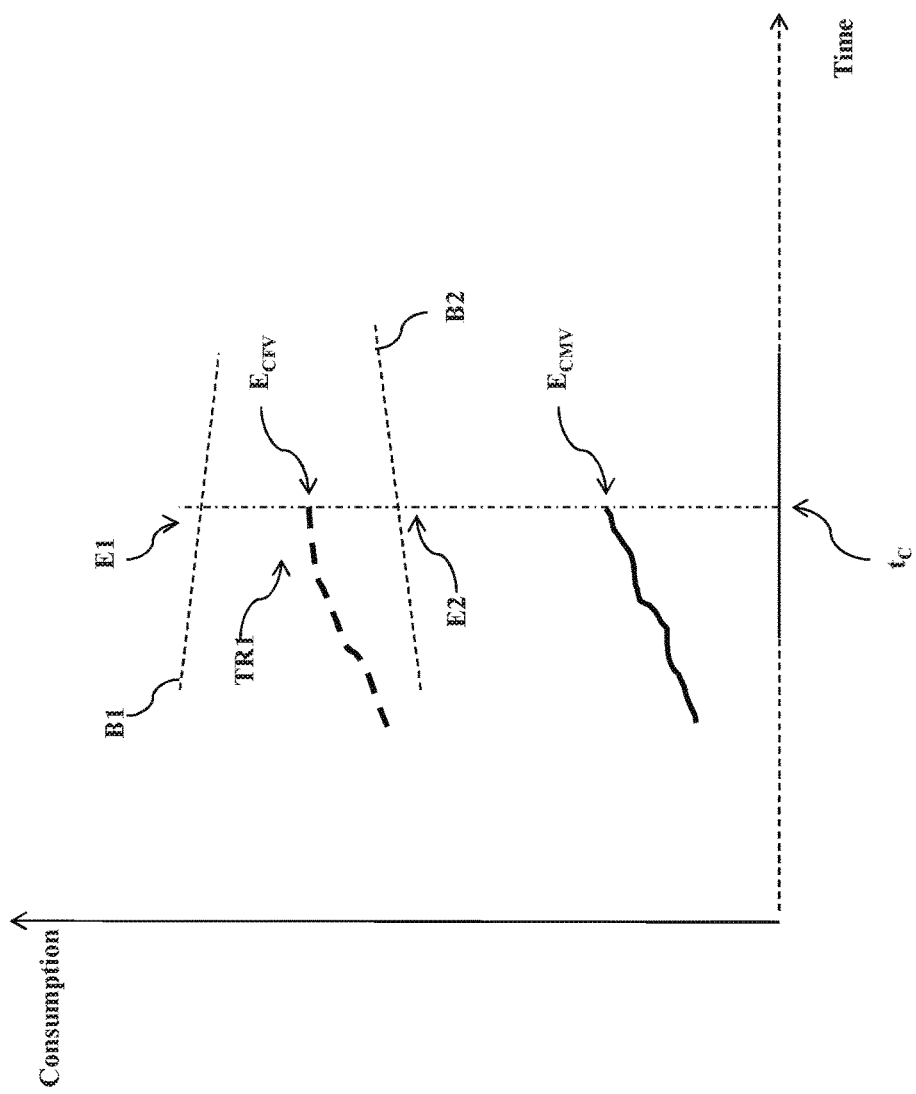

Referring to FIG. 7, it is shown a scenario in which the consumption forecast value $E_{CTV}$ meets the following condition: $\{E_{CFV} < E1; E_{CFV} > E2\}$.

This condition meets the above mentioned first convergence criteria. Therefore, it will be unnecessary to change the set-points of the first grid devices $CD_1, \ldots, CD_N$ to reach the consumption target value $E_{CTV}$ at the end instant $t_E$ of the observation time window $T_{OW}$.

Figure 8:
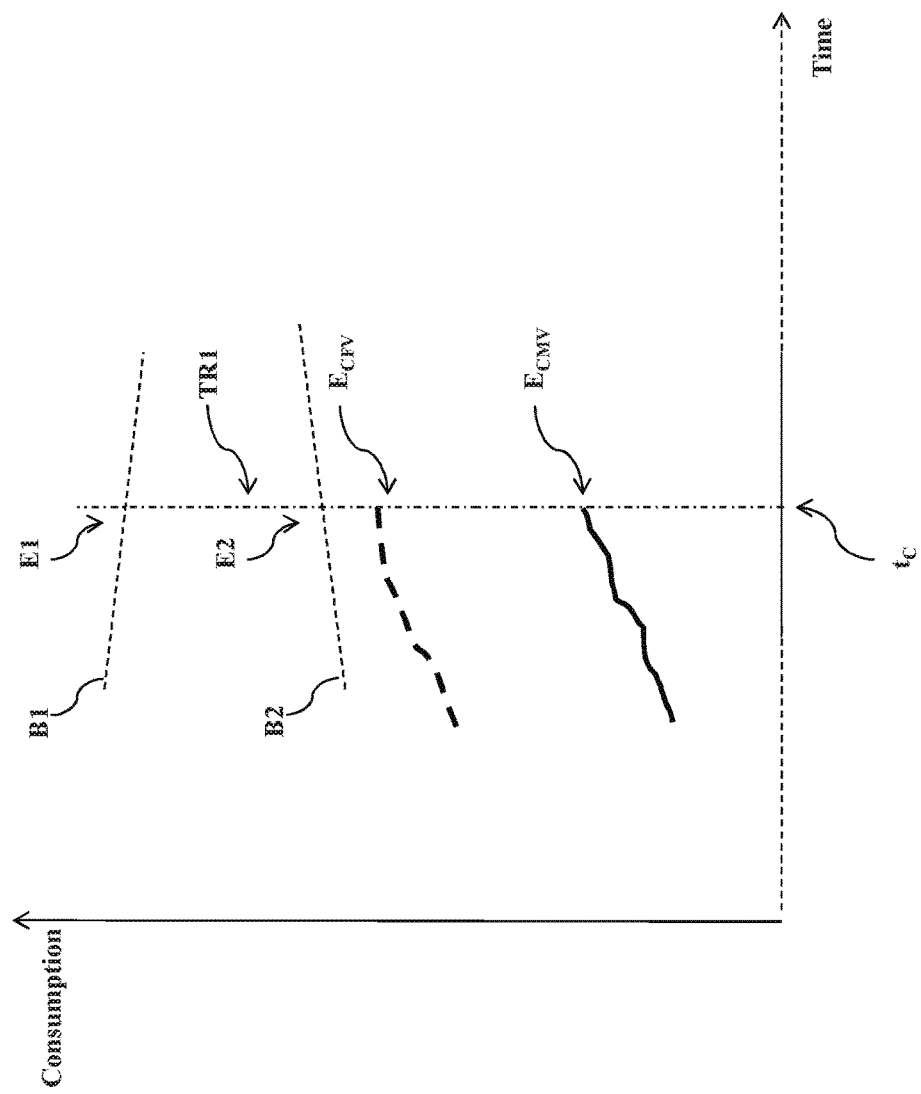

Referring to FIG. 8, it is shown a scenario in which the consumption forecast value $E_{CTV}$ meets the following condition: $\{E_{CFV} < E1; E_{CFV} < E2\}$.

This condition does not meet the above mentioned first convergence criteria. Therefore, it will be possible to change the set-points of one or more first grid devices $CD_1, \ldots, CD_N$ to reach the consumption target value $E_{CTV}$ at the end instant $t_E$ of the observation time window $T_{OW}$.

More particularly, as the consumption forecast value $E_{CFV}$ is too low with respect to the first tolerance region TR1, it will be possible to change the set-points of one or more first grid devices $CD_1, \ldots, CD_N$ in such a way to increase the consumption of the electric power distribution grid in the residual time interval $t_E - t_C$ before the end of the observation time window $T_{OW}$.

According to the invention, if the above first convergence criteria are met by the calculated consumption forecast value $E_{CFV}$, the control procedure 40 comprises the step 409 of maintaining unchanged the set-points of the first grid devices $CD_1, \ldots, CD_N$. In this case, the control procedure 40 is terminated and it will be executed at a following check instants $t_C + \Delta T_S$. According to the invention, if the above first convergence criteria are not met by the calculated consumption forecast value $E_{CFV}$, the control procedure 40 preferably provides for different sequences of steps depending on whether the set-points of the first grid devices $CD_1, \ldots, CD_N$ have already been changed or not during the observation time window $T_{OW}$, before the check instant $t_C$.

According to the invention, if the above first convergence criteria are not met by the calculated consumption forecast value $E_{CFV}$ and no set-points of the first grid devices $CD_1, \ldots, CD_N$ have already been changed at least one time during the observation time window $T_{OW}$, before the check instant $t_C$, the control procedure 40 comprises a first sequence of steps 410-414 to modify the set-points of the first grid devices $CD_1, \ldots, CD_N$.

In accordance to the above mentioned first sequence of steps, the control procedure 40 comprises a step 410 of calculating a requested power variation value $\Delta P_{REQ}$ requested to the electric power distribution grid to reach the consumption target value $E_{CTV}$ in the residual time interval $t_E$-$t_C$ before the end of the observation time window $T_{OW}$.

Preferably, the requested power variation value $\Delta P_{REQ}$ is indicative of the active power to be consumed at the observation electric node $P_{CC}$ to reach the consumption target value $E_{CTV}$.

As an example, at each check instant $t_C$, the requested power variation value $\Delta P_{REQ}$ may be calculated according to the following relation:

$$\Delta P_{REQ}(t_C) = \frac{E_{CFV}(t_C) - E_{CTV}}{t_E - t_C}$$

where $E_{CFV}(t_C)$ is the consumption forecast value calculated at the check instant $t_C$ and $t_E$-$t_C$ is the residual time interval before the end of the observation time window $T_{OW}$.

It is evidenced that the requested power variation value $\Delta P_{REQ}$ will be positive when the consumption forecast value $E_{CFV}$ is too high with respect to the first tolerance region TR1 (FIG. 6). In fact, in this case, it is possible to change the set-points of the first grid devices $CD_1, \ldots, CD_N$ in such a way to reduce the consumption of the electric power distribution grid 100 to reach the consumption target value $E_{CTV}$ at the end instant $t_E$ of the observation time window $T_{OW}$.

On the other hand, the requested power variation value $\Delta P_{REQ}$ will be negative when the consumption forecast value $E_{CFV}$ is too low with respect to the first tolerance region TR1 (FIG. 6). In fact, in this case, it is necessary to change the set-points of the first grid devices $CD_1, \ldots, CD_N$ in such a way to increase the consumption of the electric power distribution grid 100 to reach the consumption target value $E_{CTV}$ at the end instant $t_E$ of the observation time window $T_{OW}$.

In accordance to the above mentioned first sequence of steps, the control procedure 40 comprises a step 411 of calculating, for one or more first grid devices $CD_1, \ldots, CD_N$, a characteristic curve on a $\Delta P$-r reference system, in which $\Delta P$ is an available variation of power and r is a priority assigned to the set-points of said first grid device.

Preferably, the mentioned characteristic curves on a $\Delta P$-r reference system are calculated only for the first grid devices $CD_1, \ldots, CD_N$ that are active at the check instant $t_C$.

For the sake of clarity, it is here specified that a grid device is considered as "active" when it is not disconnected from the electric power distribution grid 100 for any reasons and it can fully operate.

The step 411 of the control procedure 40 is based on the above mentioned circumstance that, at each check instant $t_C$, the operation of each first grid device $CD_1, \ldots, CD_N$ may be represented by characteristic curves expressing the available (positive or negative) variation $\Delta P$ of power for said first grid device (when the set-points of said first device are modified) as a function of the priority r assigned to the set-points of said first grid device.

The characteristic curves of a given first grid device may be calculated on the base of the set-points established at the start instant $t_S$ of the observation time window $T_{OW}$ for said first grid device and on the base of the technical constraints and time constraints established for said first grid device.

As an example, the characteristic curve of an electric generator may be calculated on the base of the output power set for said electric generator at the start instant $t_S$ of the observation time window $T_{OW}$, the maximum output power foreseen for said electric generator and the number of set-point regulation levels, with which said electric power generator can provide and regulate its output power.

Preferably, the characteristic curves calculated for the first grid devices are linear functions that can be defined as $\Delta P_i(r) = A_i + B_i r$, where the coefficients $A_i$, $B_i$ depend on the set-points, the technical constraints and the time constraints established for the first grid devices.

In a practical implementation of the invention, the characteristic curves calculated for the first grid devices $CD_1, \ldots, CD_N$ may advantageously consist of tables of values, which can be stored in a storage medium.

Figure 11B:
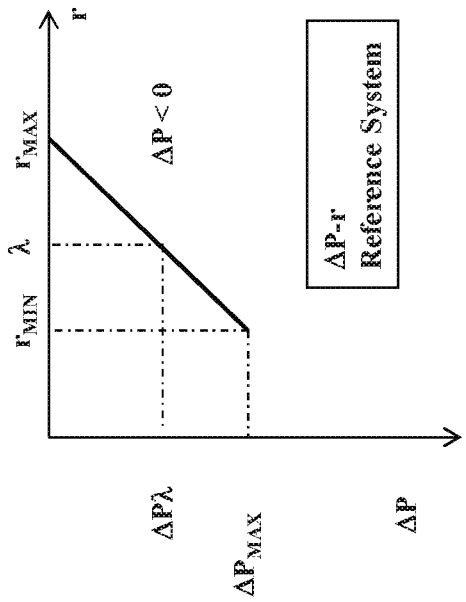
Figure 11A:
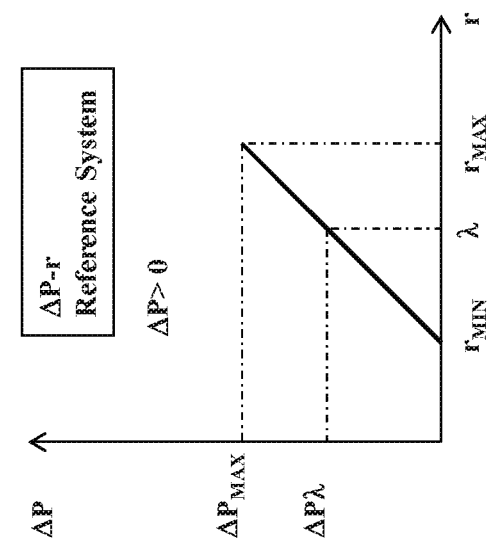

Examples of characteristic curves for a generic first grid device $CD_1, \ldots, CD_N$ at a generic check instant are schematically represented in FIGS. 11A-11B.

As a convention, a "generator convention" is adopted for the curves shown in the mentioned figures. However, an opposite "load convention" may be adopted.

In FIG. 11A, it is shown a characteristic curve for a generic first grid device $CD_1, \ldots, CD_N$ at a generic check instant for a positive variation of power.

In FIG. 11B, it is shown a characteristic curve for a generic first grid device $CD_1, \ldots, CD_N$ at a generic check instant for a negative variation of power.

As it may be easily understood from the above, the characteristic curves on the $\Delta P$-r reference system for each first grid device $CD_1, \ldots, CD_N$ may change from one check instant to another depending on the operating conditions of said first grid device.

Further, said characteristic curves may change depending on the type of said first grid device, i.e. depending on whether said first grid device is a driver, an on/off load, a battery, a capacitors bank, a current or voltage generator, and the like.

In accordance to the above mentioned first sequence of steps, the control procedure 40 comprises a step 412 of calculating a characteristic curve on the $\Delta P$-r reference system for the electric power distribution grid 100.

The step 412 of the control procedure 40 is based on the fact that, at each check instant $t_C$, the operation of electric power distribution grid 100 may be represented by a characteristic curve on the $\Delta P$-r reference system. In this case, $\Delta P$ is the available (positive or negative) variation of power for the electric power distribution grid 100 by changing the set-points of the first grid devices $CD_1, \ldots, CD_N$ (preferably of those active at the check instant $t_C$) and r is the priority assigned to the electric power distribution grid 100.

The characteristic curve of the electric power distribution grid 100 on the $\Delta P$-r reference system may be calculated based on the characteristic curves calculated for the first grid devices $CD_1, \ldots, CD_N$ (preferably for those active at the check instant $t_C$).

Figure 12:
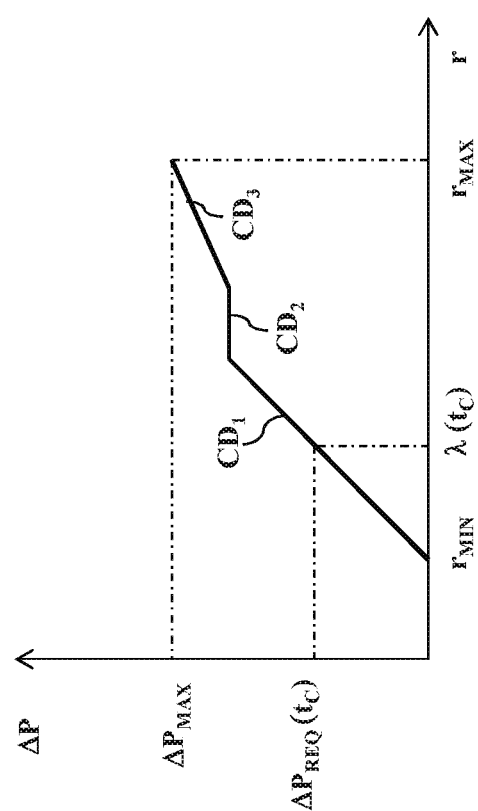

An example of characteristic curve for the electric power distribution grid 100 at a generic check instant is schematically represented in FIG. 12. As it may be easily understood, the illustrated characteristic curve is obtained by combining (e.g. by summing) the characteristic curves calculated for three first grid devices $CD_1, CD_2, CD_3$ on the $\Delta P$-r reference system.

As for the first grid devices, the characteristic curve on a $\Delta P$-r reference system for the electric power distribution grid 100 may change from one check instant to another depending on the operating conditions of the first grid devices $CD_1, \ldots, CD_N$ and depending on which first grid devices are active at the check instant $t_C$.

In accordance to the above mentioned first sequence of steps, the control procedure 40 comprises a step 413 of calculating a priority level λ for the electric power distribution grid 100 at the check instant $t_C$.

The priority level λ is advantageously calculated on the base of the data calculated at the steps 410-412 of the control procedure 40, in particular on the base of the requested power variation value $\Delta P_{REQ}$ and the characteristic curves calculated for the first grid devices $CD_1, \ldots, CD_N$ (preferably for those active at the check instant $t_C$) and for the electric power distribution grid 100.

According to a possible practical implementation of the invention, the priority level λ at the check instant $t_C$ is geometrically identified (by means of known interpolation algorithms) on the characteristic curve of the electric power distribution grid 100 on the base of the requested power variation value $\Delta P_{REQ}$.

In practice, according to such an approach, the priority level $\lambda(t_C)$ at the check instant $t_C$ is the priority value corresponding to the requested power variation value $\Delta P_{REQ}(t_C)$, as calculated at the check instant $t_C$, on the characteristic curve on the ΔP-r reference system calculated for the electric power distribution grid 100 (FIG. 12).

According to an alternative practical implementation of the invention, the priority level λ is calculated by solving an optimization problem involving the first grid devices $CD_1, \ldots, CD_N$ (preferably those active at the check instant $t_C$).

Said optimization problem may be advantageously defined on the base of the set-points established for said first grid devices at the start instant is of the observation time window $T_{OW}$, on the base of the characteristic curves calculated for said first grid devices and on the base of the requested variation value of power $\Delta P_{REQ}$.

As an example, said optimization problem may be expressed by the following relation:

$$\min_{\Delta P} W_T(\Delta P) = \min_{\Delta P = (\Delta P_1, \ldots, \Delta P_N)} \sum_{i=1}^{N} W_i(\Delta P_i)$$

where $W_i(\Delta P_i)$ is the weighted characteristic curve on the ΔP-r reference system for the i-th first grid device, $\Delta P_i$ is the power set-point for said i-th first grid device and N is the number of first grid devices (preferably of those active at the check instant $t_C$).

As mentioned above, the characteristic curve on the on the ΔP-r reference system for the i-th first grid device is a linear function of the type $\Delta P_i(r) = A_i + B_i r$, where the coefficients $A_i$, $B_i$ depends on the set-points, the technical constraints and time constraints established for said first grid device.

The constrains for the optimization problem mentioned above may include the technical constraints established for the first grid devices (preferably for those active at the check instant $t_C$) and constraints related to the operation of the electric power distribution grid 100 due to the fact that the consumption target value $E_{CTV}$ has to be reached at the end instant $t_E$ of the observation time window $T_{OW}$.

These latter constrains may be expressed by the following relation $$\Delta P_{REQ} - \sum_{i=1}^{N} \Delta P_i = 0$$

where $\Delta P_{REQ}$ is the requested variation value of power at the check instant $t_C$, which is calculated for the electric power distribution grid 100 at the step 410 of the control procedure 40, and $\Delta P_i$ is the variation of power that can be provided by the i-th first grid device in the residual time interval $t_E - t_C$ before the end of the observation time window $T_{OW}$.

The set of differential equations expressing the above mentioned optimization problem may be easily solved, e.g. by using known ILM (Iteration Lambda Method) algorithms.

Following the calculation of the priority level λ for the electric power distribution grid 100, the procedure 40 provides for intervening on the set-points of the first grid devices $CD_1, \ldots, CD_N$ (preferably of those active at the check instant $t_C$).

In accordance to the above mentioned first sequence of steps, the control procedure 40 comprises a step 414 of providing control signals CON to change the set-points of the first grid devices $CD_1, \ldots, CD_N$ (preferably of those active at the check instant $t_C$).

The control signals CON provide information on the priority level λ of the electric power distribution grid 100 at the check instant $t_C$, which has been calculated at the above mentioned step 413 of the control procedure 40.

In response to the control signals CON, the first grid devices $CD_1, \ldots, CD_N$ will behave in accordance to their characteristic curves on the ΔP-r reference system (FIGS. 11A-11B).

In FIG. 11A, it is shown a characteristic curve for a generic first grid device $CD_1, \ldots, CD_N$ for a (requested) positive variation of power ($\Delta P_{REQ} > 0$).

According to said characteristic curve, the behaviour of a generic first grid device will be as follows:
- if the priority level λ of the electric power distribution grid 100 is lower than or equal to the minimum priority level $r_{MIN}$ provided for the set-points of said first grid device (i.e. when $\lambda <= r_{MIN}$), said first grid device will not change its set-points;
- if the priority level λ is higher than or equal to the maximum priority level $r_{MAX}$ provided for the set-points of said first grid device (i.e. when $\lambda >= r_{MAX}$), said first grid device will change its set-points to provide the maximum positive variation $\Delta P_{MAX}$ of power, which is available in view of the technical constrains of said grid device;
- if the priority level λ is comprised between the minimum and maximum priority levels $r_{MIN}$, $r_{MAX}$ provided for the set-points of said first grid device (i.e. when $r_{MIN} < \lambda < r_{MAX}$), said first grid device will change its set-points to provide a (positive) variation of power $\Delta P_\lambda$ corresponding to the priority level λ.

In FIG. 11B, it is shown a characteristic curve for a generic first grid device $CD_1, \ldots, CD_N$ for a (requested) negative variation of power ($\Delta P_{REQ} < 0$).

According to said characteristic curve, the behaviour of a generic first grid device will be as follows:
- if the priority level λ is lower than or equal to the minimum priority level $r_{MIN}$ provided for the set-points of said first grid device (i.e. when $\lambda <= r_{MIN}$), said first grid device will change its set-points to provide the maximum positive variation $\Delta P_{MAX}$ of power, which is available in view of the technical and time constrains of said grid device;
- if the priority level λ is higher than or equal to the maximum priority level $r_{MAX}$ provided for the set-points of said first grid device (i.e. when $\lambda >= r_{MAX}$), said first grid device said first grid device will not change its set-points;

if the priority level $\lambda$ is comprised between the minimum and maximum priority levels $r_{MIN}$, $r_{MAX}$ provided for the set-points of said first grid device (i.e. when $r_{MIN} < \lambda < r_{MAX}$), said first grid device will change its set-points to provide a (negative) variation of power $\Delta P_\lambda$ corresponding to said priority level $\lambda$.

At the step 414, the control procedure 40 is terminated and it will be executed at a following check instants $t_C + \Delta T_S$.

According to a preferred embodiment of the invention, if the above first convergence criteria are not met by the calculated consumption forecast value $E_{CFV}$ and the set-points of the first grid devices $CD_1, \ldots, CD_N$ have already been changed at least once during the observation time window $T_{OW}$, before the check instant $t_C$, the control procedure 40 provides for a second sequence of steps 415-421 to modify the set-points of the first grid devices $CD_1, \ldots, CD_N$.

Referring to FIGS. 9A-9B, 10A-10B, some scenarios are shown in which the set-points of one or more first grid devices $CD_1, \ldots, CD_N$ have already been changed during the observation time window $T_{OW}$, namely at an instant $t_P = t_C - \Delta T$ preceding the check instant $t_C$.

Figure 9A:
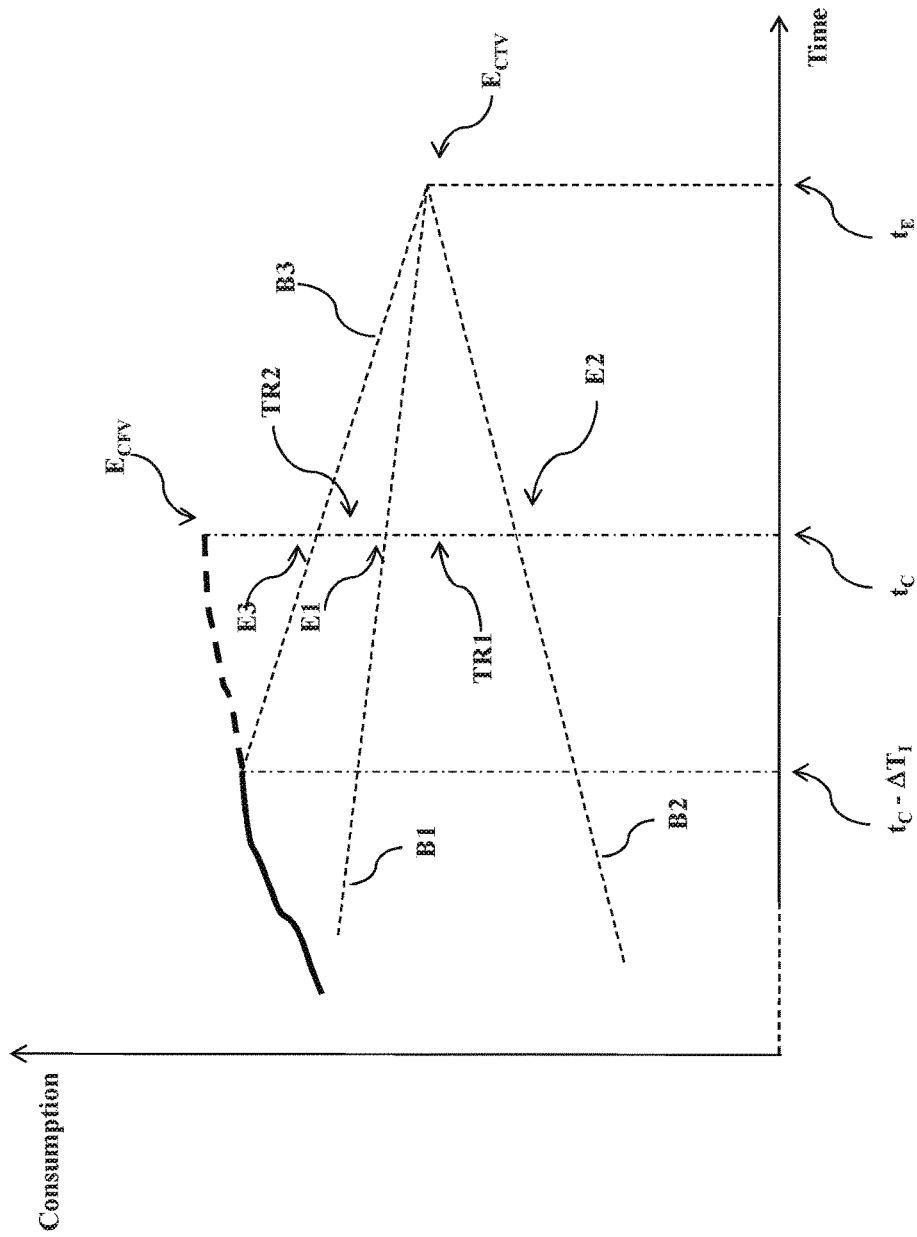
Figure 9B:
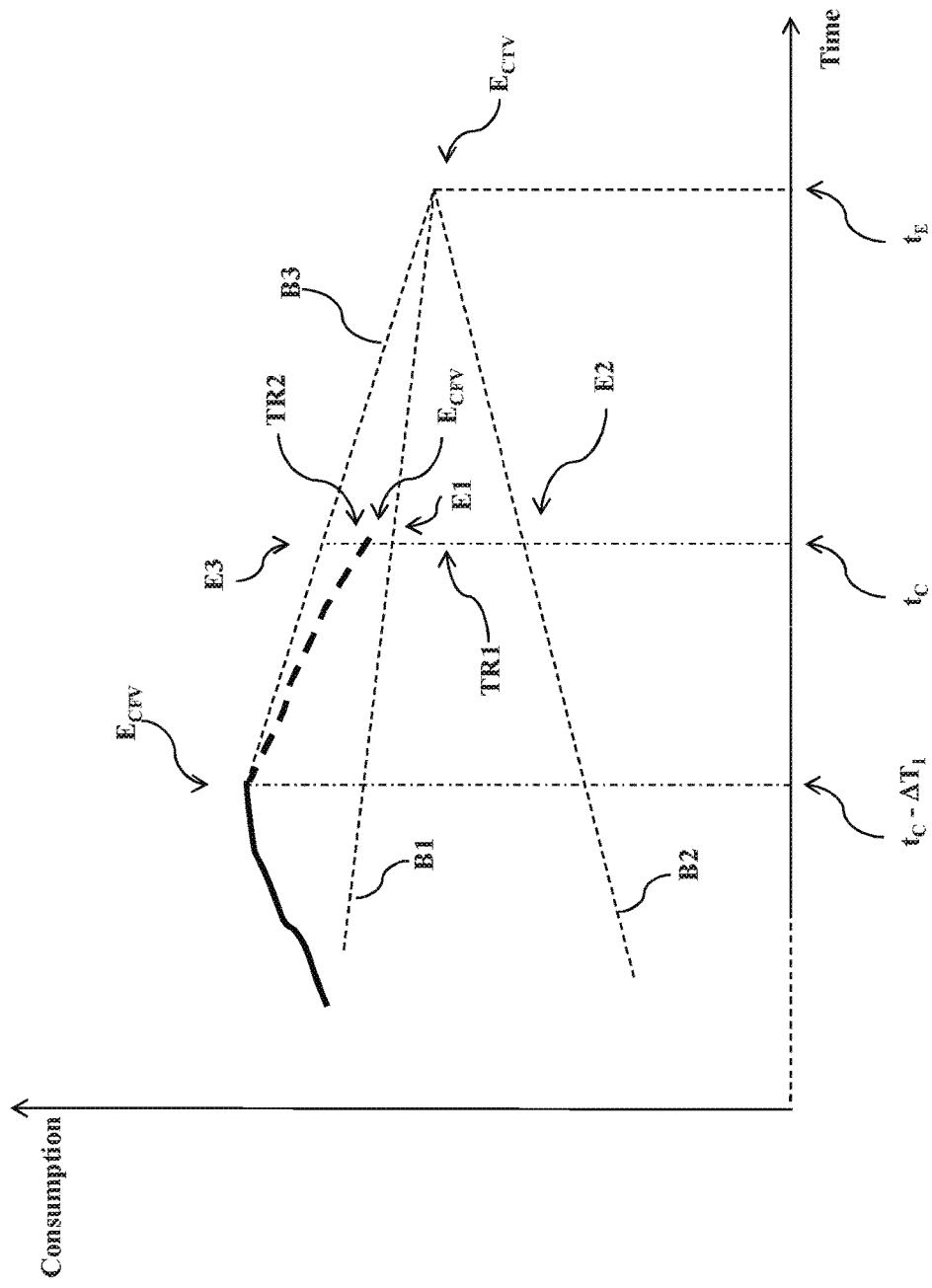

In FIGS. 9A-9B, scenarios are shown in which the consumption forecast value $E_{CFV}$, at the check instant $t_C$, still meets the condition $\{E_{CFV} > E1; E_{CFV} > E2\}$ despite of the intervention on the set-points of the first grid devices at an instant $t_P = t_C - \Delta T_I$ preceding the check instant $t_C$. Such a condition does not meet the above mentioned first convergence criteria.

Figure 10A:
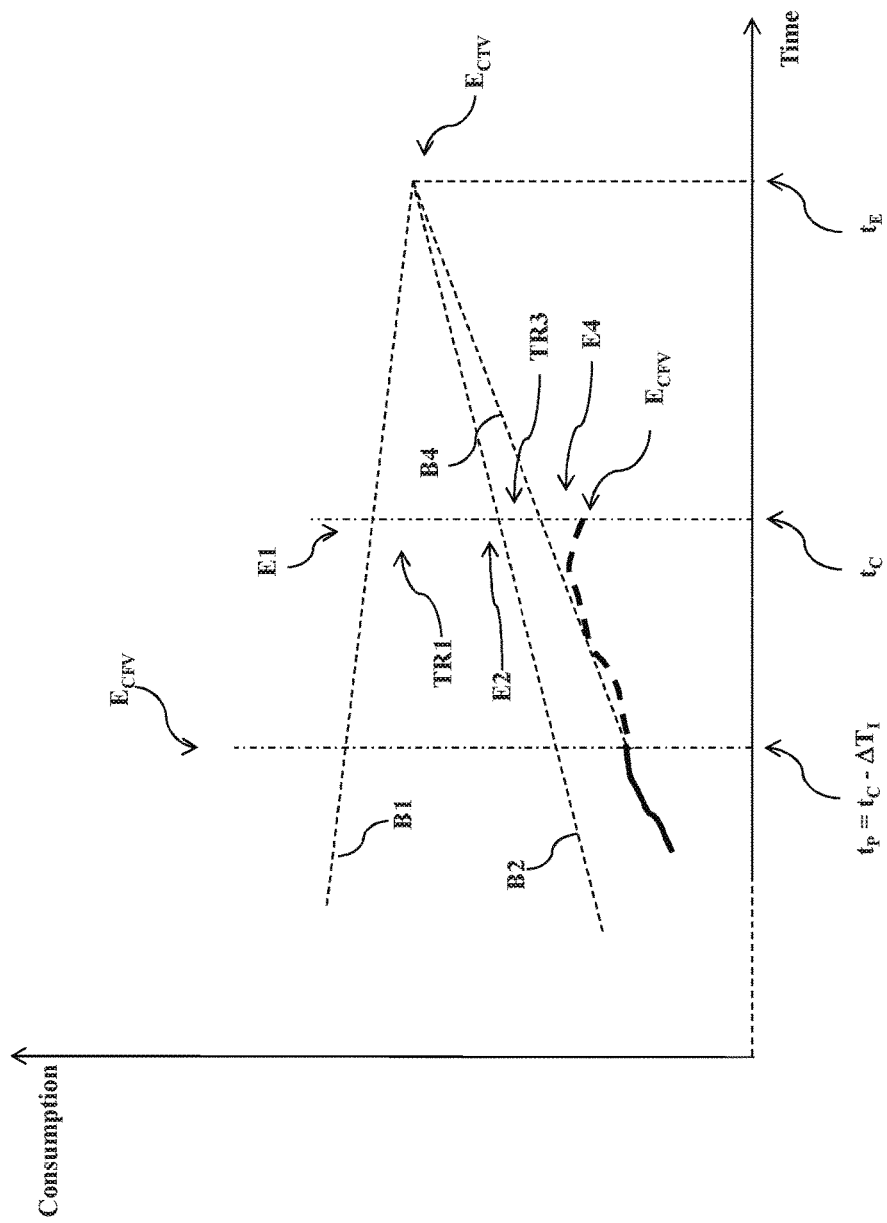
Figure 10B:
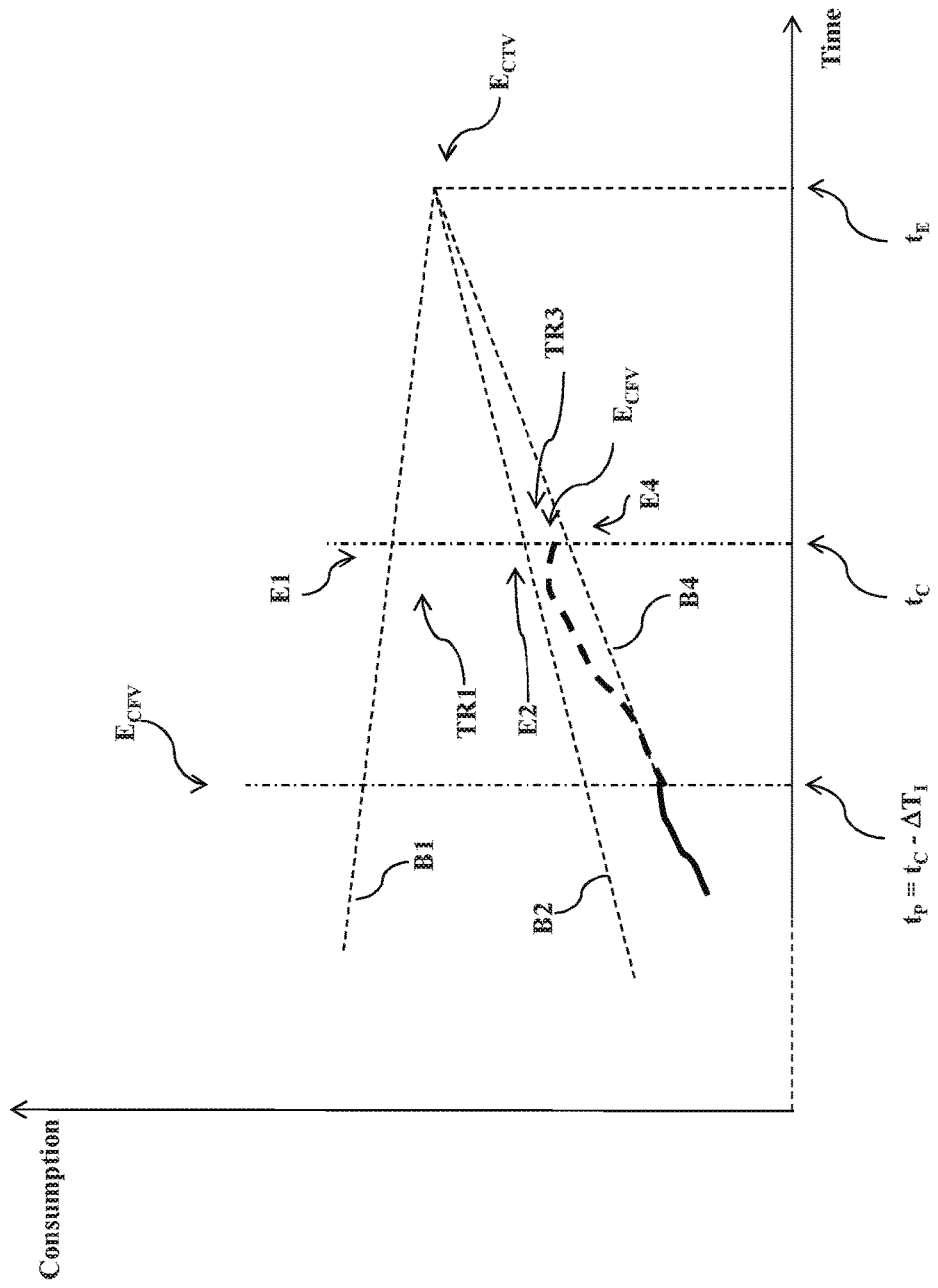

In FIGS. 10A-10B, scenarios are shown in which the consumption forecast value $E_{CFV}$, at the check instant $t_C$, still meets the condition $\{E_{CFV} < E1; E_{CFV} < E2\}$ despite of the intervention on the set-points of the first grid devices at an instant $t_P = t_C - \Delta T_I$ preceding the check instant $t_C$. Also such a condition does not meet the above mentioned first convergence criteria.

In the above illustrated scenarios, the control procedure 40 provides for executing the above mentioned second sequence of steps 415-421 to modify the set-points of the first grid devices $CD_1, \ldots, CD_N$.

Preferably, the control procedure 40 comprises the step 415 of checking whether the consumption forecast value $E_{CFV}$ meets, at the check instant $t_C$, second convergence criteria (different from said first convergence criteria) with respect to the consumption target value $E_{CTV}$.

Preferably, according to said second convergence criteria, the consumption forecast value $E_{CFV}$, at the check instant $t_C$, must satisfy the following condition:

$$\{E_{CFV} >= E1; E_{CFV} <= E3\} \text{ or } \{E_{CFV} <= E2; E_{CFV} >= E4\}$$

wherein E1, E2 (with E1>E2) are respectively the first and second predefined boundary values considered by the above mentioned first converging criteria and E3, E4 are respectively third and fourth predefined boundary values, with E3>E1 and E4<E2.

Preferably, the third and fourth predefined boundary values E3, E4 depend on the consumption forecast value $E_{CFV}$ calculated at the instant $t_P = t_C - \Delta T_I$, which precedes the check instant $t_C$.

As an example, at the check instant $t_C$, the third and fourth predefined boundary values E3, E4 may be calculated according to the following relation:

$$E3, E4 = E_{CFV}(t_P) + \frac{E_{CTV} - E_{CFV}(t_P)}{t_E - t_P}(t_C - t_P)$$

where $E_{CFV}(t_P)$, $E_{CTV}$ are respectively the consumption forecast value $E_{CFV}$ calculated at the instant $t_P = t_C - \Delta T_I$ and the consumption target value at the end instant $t_E$ of the observation time window $T_{OW}$.

In practice, at the step 415, the control procedure 40 provides for checking whether the consumption forecast value $E_{CFV}$, which still falls out of the first tolerance region TR1 despite of the intervention on the set-points of the first grid devices at the instant $t_P = t_C - \Delta T_I$, falls within a second tolerance region TR2 or falls within a third tolerance region TR3, which are defined by additional predefined boundaries B3, B4 ensuring the convergence to the consumption target value $E_{CTV}$.

Said predefined boundaries are indicative of the sequence of the maximum and minimum consumption forecast derivative values ensuring that the consumption target value $E_{CTV}$ is achieved without further intervening on the first grid devices $CD_1, \ldots, CD_N$.

Referring to FIGS. 9A-9B, 10A-10B, said predefined boundaries are schematically represented by corresponding boundary lines B3, B4 converging to the consumption target value $E_{CTV}$ and intersecting the consumption target value $E_{CFV}$ calculated at the instant $t_P$ and the consumption target value $E_{CTV}$ at the end instant $t_E$ of the observation time window $T_{OW}$. Referring to FIG. 9A, it is shown a scenario in which the consumption forecast value $E_{CFV}$ meets the following condition: $\{E_{CFV} > E1; E_{CFV} > E3\}$.

This condition does not meet the above mentioned second convergence criteria. Therefore, it will be necessary to change the set-points of one or more first grid devices $CD_1, \ldots, CD_N$ to reach the consumption target value $E_{CTV}$ at the end instant $t_E$ of the observation time window $T_{OW}$.

More particularly, as the consumption forecast value $E_{CFV}$ is too high with respect to the second tolerance region TR2 despite of the previous intervention on the set-points at the instant $t_P$, it will be necessary to change the set-points of one or more first grid devices $CD_1, \ldots, CD_N$ in such a way to further reduce the consumption of the electric power distribution grid in the residual time interval $t_E - t_C$ before the end of the observation time window $T_{OW}$.

Referring to FIG. 9B, it is shown a scenario in which the consumption forecast value $E_{CFV}$ meets the following condition: $\{E_{CFV} > E1; E_{CFV} < E3\}$.

This condition meets the above mentioned second convergence criteria. Therefore, it will be unnecessary to further change the set-points of the first grid devices $CD_1, \ldots, CD_N$ to reach the consumption target value $E_{CTV}$ at the end instant $t_E$ of the observation time window $T_{OW}$. As the consumption forecast value $E_{CFV}$ is within the second tolerance region TR2, the consumption of the electric power distribution grid 100 is already converging to the consumption target value $E_{CTV}$ thanks to the intervention on the set-points of the first grid devices that have been carried out at the instant $t_P = t_C - \Delta T_I$, which precedes the check instant $t_C$.

Referring to FIG. 10A, it is shown a scenario in which the consumption forecast value $E_{CFV}$ meets the following condition: $\{E_{CFV} < E2; E_{CFV} < E4\}$.

This condition does not meet the above mentioned second convergence criteria. Therefore, it will be necessary to change the set-points of one or more first grid devices $CD_1, \ldots, CD_N$ to reach the consumption target value $E_{CTV}$ at the end instant $t_E$ of the observation time window $T_{OW}$.

More particularly, as the consumption forecast value $E_{CFV}$ is too low with respect to the second tolerance region TR2 despite of the previous intervention on the set-points at the instant $t_P$, it will be possible to change the set-points of the first grid devices $CD_1, \ldots, CD_N$ in such a way to further increase the consumption of the electric power distribution grid in the residual time interval $t_E$–$t_C$ before the end of the observation time window $T_{OW}$.

Referring to FIG. 10B, it is shown a scenario in which the consumption forecast value $E_{CFV}$ meets the following condition: $\{E_{CFV} < E2; E_{CFV} > E4\}$.

This condition meets the above mentioned second convergence criteria. Therefore, it will be unnecessary to further change the set-points of the first grid devices $CD_1, \ldots, CD_N$ to reach the consumption target value $E_{CTV}$ at the end instant $t_E$ of the observation time window $T_{OW}$. As the consumption forecast value $E_{CFV}$ is within the second tolerance region TR2, the consumption of the electric power distribution grid 100 is already converging to the consumption target value $E_{CTV}$ thanks to the intervention on the set-points of the first grid devices that have been carried out at the instant $t_P = t_C - \Delta TI$, which precedes the check instant $t_C$.

Preferably, if the above second convergence criteria are met by the calculated the consumption forecast value $E_{CFV}$, the control procedure 40 comprises the step 416 of maintaining unchanged the set-points of the first grid devices $CD_1, \ldots, CD_N$. In this case, the control procedure 40 is terminated and it will be executed at a following check instants $t_C + \Delta T_S$.

Preferably, if the above second convergence criteria are not met by the calculated the consumption forecast value $E_{CFV}$, the control procedure 40 provides for executing some steps 417-421 to modify the set-points of the first grid devices $CD_1, \ldots, CD_N$. The steps 417-421 of the control procedure 40 are similar (in practice identical, mutatis mutandis) to the steps 410-414 described above.

Preferably, the control procedure 40 comprises a step 417 of calculating a requested power variation value $\Delta P_{REQ}$ for the electric power distribution grid to reach the consumption target value $E_{CTV}$ in the residual time interval $t_E - t_C$ before the end of the observation time window $T_{OW}$.

Preferably, the requested power variation value $\Delta P_{REQ}$ is indicative of the power to be consumed at the observation electric node $P_{CC}$ to reach the consumption target value $E_{CTV}$.

The requested power variation value $\Delta P_{REQ}$ may be calculated as described above.

Again, the requested power variation value $\Delta P_{REQ}$ will be positive or negative depending on whether the consumption forecast value $E_{CTV}$ is too high (FIGS. 9A-9B) or too low (FIGS. 10A-10B) with respect to the first tolerance region TR1.

Preferably, the control procedure 40 comprises a step 418 of calculating, for each first grid device $CD_1, \ldots, CD_N$, a characteristic curve on a $\Delta P$-r reference system, in which $\Delta P$ is an available variation of power and r is a priority assigned to the set-points of said first grid device.

Preferably, the mentioned characteristic curves on a $\Delta P$-r reference system are calculated only for the first grid devices $CD_1, \ldots, CD_N$, which are active at the check instant $t_C$.

The characteristic curves of each first grid device $CD_1, \ldots, CD_N$ may be calculated as described above.

Preferably, the characteristic curves calculated for the first grid devices (preferably for those active at the check instant $t_C$) are linear functions that can be defined as $\Delta P_i(r) = A_i + B_i r$, where the coefficients $A_i$, $B_i$ depends on the set-points, the technical constraints and the time constraints established for the first grid devices.

Preferably, the control procedure 40 comprises a step 419 of calculating, at the check instant $t_C$, a characteristic curve on the $\Delta P$-r reference system for the electric power distribution grid 100. The characteristic curve of the electric power distribution grid 100 may be calculated as described above.

Preferably, the control procedure 40 comprises a step 420 of calculating a priority level $\lambda$ for the electric power distribution grid 100 at the check instant $t_C$.

The priority level $\lambda$ is advantageously calculated on the base of the data calculated at the steps 417-419 of the control procedure 40, in particular on the base of the requested power variation value $\Delta P_{REQ}$ and the characteristic curves calculated for the first grid devices $CD_1, \ldots, CD_N$ and for the electric power distribution grid 100.

The priority level $\lambda$ of the electric power distribution grid 100, at the check instant $t_C$, may be calculated as described above.

Following the calculation of the priority level $\lambda$ for the electric power distribution grid 100, the procedure 40 provides for further intervening on the set-points of the first grid devices (preferably of those active at the check instant $t_C$).

Preferably, the control procedure 40 comprises a step 421 of providing control signals CON to change the set-points of the first grid devices $CD_1, \ldots, CD_N$ (preferably of those active at the check instant $t_C$).

The control signals CON provide information of the priority level $\lambda$ of the electric power distribution grid 100 at the check instant $t_C$, which has been calculated at the above mentioned step 413 of the control procedure 40.

In response to the control signals CON, the first grid devices $CD_1, \ldots, CD_N$ will behave in accordance to their characteristic curves on the $\Delta P$-r reference system as described above (FIGS. 11A-11B).

At the step 421, the control procedure 40 is terminated and it will be executed at a following check instants $t_C + \Delta T_S$.

According to possible embodiments of the invention, if the above first convergence criteria are not met by the calculated consumption forecast value $E_{CFV}$ and the set-points of the first grid devices $CD_1, \ldots, CD_N$ have already been changed at least once during the observation time window $T_{OW}$, the control procedure 40 is merely terminated and it will be executed at a following check instants $t_C + \Delta T_S$.

In practice, such alternative embodiments of the invention provide for intervening on the set-points of the first grid devices $CD_1, \ldots, CD_N$ only once in the observation time window $T_{OW}$.

Preferably, the method 1 comprises the step 5 of setting a priority level $\lambda$ for the electric power distribution grid 100 at the end instant $t_E$ of the observation time window $T_{OW}$.

According to some embodiments of the invention, such a priority level $\lambda$ may be a predefined value to be set at the end of each observation time window $T_{OW}$ (and at the beginning of the following one).

According to other embodiments of the invention, such a priority level $\lambda$ may be the priority level calculated at the last intervention on the on the set-points of the first grid devices $CD_1, \ldots, CD_N$.

According to some embodiments of the invention, the method 1 comprises the step 6A of providing control signals CON to set the set-points of the first grid devices $CD_1, \ldots, CD_N$ at corresponding predefined values at the end instant $t_E$ of the observation time window $T_{OW}$.

In practice, these embodiments of the invention provides for resetting the set-points of the first grid devices $CD_1, \ldots, CD_N$ at the end of the observation time window $T_{OW}$.

According to alternative embodiments of the invention, the method 1 comprises the step 6B of maintaining unchanged the set-points of the first grid devices $CD_1, \ldots, CD_N$ at the end instant $t_E$ of the observation time window $T_{OW}$.

In practice, such alternative embodiments of the invention provides for maintaining the set-points of the first grid devices $CD_1, \ldots, CD_N$ as set at the last intervention on the set-points of the first grid devices $CD_1, \ldots, CD_N$.

The method, according to the invention, is particularly to be implemented by a computerised device 300.

In a further aspect, the present invention thus relates to a computer program 350 comprising software instructions to carry out the method, according to the invention.

The computer program 350 is stored or storable in a storage medium, e.g. in a memory of the computerised device 300 (FIG. 1).

In a further aspect, the present invention further relates to a computerised device 300 comprising computerised resources (e.g. one or more microprocessors) configured to execute software instructions to carry out the method, according to the invention.

The computerised device 300 may be a computerised device installed on the field or in a remote location with respect to the electric power distribution grid 100.

As an example, the computerised device 300 may be a control and protection unit installed on board a switching device, or a digital relay for electric power distribution grids or a controller.

In a further aspect, the present invention, relates to a control apparatus 200 including hardware and software resources configured to implement the method, according to the invention.

The control apparatus 200 may be arranged according to various control architectures, e.g. centralized architectures or multi-level architectures.

As an example, as shown in FIG. 1, the control apparatus may comprise a controller 300 provided with processing resources configured to execute software instructions to carry out the method, according to the invention.

Of course, other control architectures that are different from the one described above may be adopted according to the needs.

The method, according to the present invention, is quite effective in managing the consumption of an electric power distribution grid.

The method, according to the present invention, allows remarkably reducing power demand peaks.

The method, according to the present invention, is particularly adapted to properly manage the operation of an electric power distribution grid taking into account the current functioning time (e.g. the time of day), the energy costs, the availability of less expensive power sources, and the like.

The method, according to the present invention, is particularly adapted to be implemented by various control architectures, according to the needs, for example centralised, multi-level or distributed control architectures.

The method, according to the present invention, is particularly adapted to be implemented using the hardware and software resources that are already installed on the field to manage the operation of the electric power distribution grid.

The method, according to the invention, is particularly adapted for being implemented in digitally enabled power distribution networks (smart grids, micro grids and the like). The method, according to the invention, is of relatively easy and cost-effective practical implementation on the field.

The invention claimed is:

1. A method for controlling an electric power distribution grid, said electric power distribution grid comprising one or more first grid devices ($CD_1, \ldots, CD_N$)-having changeable set-points, said method comprising the following steps:

determining a consumption target value ($E_{CTV}$) for said electric power distribution grid at an end instant ($t_E$) of an observation time window ($T_{OW}$), in which a consumption of said electric power distribution grid at a given observation electric node ($P_{CC}$) of said electric power distribution grid is observed; and executing a control procedure for controlling the set-points of said first grid devices ($CD_1, \ldots, CD_N$), said control procedure comprising the following steps:

acquiring input data ($D_{IN}$) related to one or more detected electric quantities of said electric power distribution grid at a check instant (tc) within said observation time window ($T_{OW}$);

calculating a measured value ($E_{CMV}$) of consumption at said observation electric node ($P_{CC}$) at the check instant (tc);

calculating a consumption forecast value ($E_{CFV}$) for said electric power distribution grid at the end instant ($t_E$) of said observation time window ($T_{OW}$);

checking whether intervention criteria to modify one or more set-points of said first grid devices ($CD_1, \ldots, CD_N$) are met at the check instant (tc);

if said intervention criteria are not met, maintaining unchanged the set-points of said first grid devices ($CD_1, \ldots, CD_N$);

if said intervention criteria are met, checking whether the consumption forecast value ($E_{CFV}$) meets first convergence criteria with respect to the consumption target value ($E_{CTV}$);

if the consumption forecast value ($E_{CFV}$) meets said first convergence criteria, maintaining unchanged the set-points of said first grid devices ($CD_1, \ldots, CD_N$);

if said consumption forecast value ($E_{CFV}$) does not meet said first convergence criteria and no set-points of said first grid devices have already been changed before the check instant (tc), executing the following steps:

calculating a requested power variation value ($\Delta P_{REQ}$) for said electric power distribution grid to reach said consumption target value ($E_{CTV}$);

calculating, for one or more grid devices ($CD_1, \ldots, CD_N$), a characteristic curve on a $\Delta P$-r reference system, wherein $\Delta P$ is an available variation of power and r is a priority assigned;

calculating, for said electric power distribution grid, a characteristic curve on said $\Delta P$-r reference system;

calculating a priority level ($\lambda$) for said electric power distribution grid based on said requested power variation value and said characteristic curves for said one or more grid devices and for said electric power distribution grid;

providing control signals (CON) to change the set-points of one or more first grid devices ($CD_1, \ldots, CD_N$), said control signals comprising information indicative of the priority level ($\lambda$) calculated for said electric power distribution grid.

2. The method, according to claim 1, wherein if said consumption forecast value ($E_{CFV}$) does not meet said first convergence criteria and the set-points of said first grid devices ($CD_1, \ldots, CD_N$) have already been changed within said observation time window ($T_{OW}$), said control procedure comprises the following steps:
  checking whether said consumption forecast value ($E_{CFV}$) meets second convergence criteria with respect to said consumption target value ($E_{CTV}$);
  if said consumption forecast value ($E_{CFV}$) meets said second convergence criteria, maintaining unchanged the set-points of said first grid devices ($CD_1, \ldots, CD_N$);
  if said consumption forecast value ($E_{CFV}$) does not meet said second convergence criteria, executing the following steps:
    calculating a requested power variation value ($\Delta P_{REQ}$) for said electric power distribution grid to reach said consumption target value ($E_{CTV}$);
    calculating, for one or more first grid devices ($CD_1, \ldots, CD_N$), a characteristic curve on a $\Delta P$-r reference system;
    calculating a priority level ($\lambda$) for said electric power distribution grid;
    providing control signals (CON) to change the set-points of one or more first grid devices ($CD_1, \ldots, CD_N$), said control signal comprising information indicative of the priority level ($\lambda$) calculated for said electric power distribution grid.

3. The method, according to claim 1, wherein said step of checking whether said intervention criteria are met comprises the following steps:
  checking whether the check instant (tc) is within an inhibition time window ($T_{HW}$) included in said observation time window ($T_{OW}$);
  checking whether the check instant (tc) is a multiple of a given intervention period ($\Delta T_I$).

4. The method, according to claim 1, wherein said measured value ($E_{CMV}$) of consumption is calculated on the base of average values (A) related to one or more electric quantities of said electric power distribution grid, said average values being calculated on the base of said input data ($D_{IN}$).

5. The method, according to claim 1, which further comprises the step of setting a priority level ($\lambda$) for said electric power distribution grid at the end instant ($t_E$) of said observation time window ($T_{OW}$).

6. The method, according to claim 5, which further comprises the step of generating control signals (CON) to set one or more set-points of said first grid devices at corresponding predefined values at the end instant ($t_E$) of said observation time window ($T_{OW}$).

7. The method, according to claim 5, which further comprises the step of maintaining unchanged the set-points of said first grid devices at the end instant ($t_E$) of said observation time window ($T_{OW}$).

8. The method, according to claim 4, wherein that said observation time window ($T_{OW}$) has a duration corresponding to an energy billing period adopted for said electric power distribution grid.

9. The method, according to claim 4, wherein said electric, power distribution grid comprises one or more second grid devices ($UD_1, \ldots, UD_M$) having unchangeable set-points.

10. A control system structured to control an electric power distribution grid including one or more first grid devices having changeable set-points, the control system comprising:
  a processing resource;
  a non-transitory computer readable storage medium structured to store instructions executable by the processing resource to:
    determine a consumption target value for said electric power distribution grid at an end instant of an observation time window, in which a consumption of said electric power distribution grid at a given observation electric node of said electric power distribution grid is observed;
    acquire input data related to one or more detected electric quantities of said electric power distribution grid at a check instant within said observation time window;
    calculate a measured value of consumption, at said observation electric node at the check instant;
    calculate a consumption forecast value for said electric power distribution grid at the end instant of said observation time window;
    check whether intervention criteria to modify one or more set-points of said first grid devices are met at the check instant;
    if said intervention criteria are not met, maintain unchanged the set-points of said first grid devices;
    if said intervention criteria are met, check whether the consumption forecast value meets first convergence criteria with respect to the consumption target value;
    if the consumption forecast value meets said first convergence criteria, maintain unchanged the set-points of said first grid devices; and
    if said consumption forecast value does not meet said first convergence criteria and no set-points of said first grid devices have already been changed before the check instant, calculate a requested power variation value for said electric power distribution grid to reach said consumption target value, calculate for one or more first grid devices, a characteristic curve on a $\Delta P$-r reference system, wherein $\Delta P$ is an available variation of power and r is a priority assigned; calculate, for said electric power distribution grid, a characteristic curve on said $\Delta P$-r reference system; calculate a priority level for said electric power distribution grid based on said requested power variation value and said characteristic curves for said one or more grid devices and for said electric power distribution grid; and provide control signals to change the set-points of one or more first grid devices, said control signals comprising information indicative of the priority level calculated for said electric power distribution grid.

11. The control system of claim 10, wherein the instructions executable by the processing resource are further configured such that if said consumption forecast value does not meet said first convergence criteria and the set-points of said first grid devices have already been changed within said observation time window, the processing resource;
  checks whether said consumption forecast value meets second convergence criteria with respect to said consumption target value;
  if said consumption forecast value meets said second convergence criteria, maintains unchanged the set-points of said first grid devices; and
  if said consumption forecast value does not meet said second convergence criteria, calculates a requested power variation value for said electric power distribution grid to reach said consumption target value ($E_{CTV}$); calculates for one or more first grid devices, a characteristic curve on a $\Delta P$-r reference system; calculates for said electric power distribution grid, a characteristic curve on said $\Delta P$-r reference system; calculates a priority level for said electric power distribution grid;

and provides control signals to change the set-points of one or more first grid devices, said control signal comprising information indicative of the priority level calculated for said electric power distribution grid.

12. The control system of claim 10 wherein checking whether said intervention criteria are met includes checking whether the check instant is within an inhibition time window included in said observation time window and checking whether the check instant is a multiple of a given intervention period.

13. The control system of claim 10 wherein said measured value of consumption is calculated on the base of average values related to one or more electric quantities of said electric power distribution grid, said average values being calculated on the base of said input data.

14. The control system of claim 10 wherein the instructions executable by the processing resource are further configured so as to set a priority level ($\lambda$) for said electric power distribution grid at the end instant of said observation time window.

15. The control system of claim 14 wherein the instructions executable by the processing resource are further configured so as to generate control signals to set one or more set-points of said first grid devices at corresponding predefined values at the end instant of said observation time window.

16. The control system of claim 14 wherein the instructions executable by the processing resource are further configured so as to maintain unchanged the set-points of said first grid devices at the end instant of said observation time window.

17. The control system of claim 10 wherein said observation time window has a duration corresponding to an energy billing period adopted for said electric power distribution grid.

18. The control system of claim 10 wherein said electric power distribution grid comprises one or more second grid devices having unchangeable set-points.

19. The control system of claim 10 wherein the control system is incorporated into a circuit breaker.

\* \* \* \* \*